United States Patent
Saha et al.

(10) Patent No.: US 9,754,040 B2
(45) Date of Patent: Sep. 5, 2017

(54) CONFIGURING A CONTENT DOCUMENT FOR USERS AND USER GROUPS

(75) Inventors: Shoumen Saha, San Francisco, CA (US); Jun Yang, Cupertino, CA (US); Jesse Shieh, San Francisco, CA (US); Jon Snitow, Redwood City, CA (US)

(73) Assignee: Google Inc., Mountain View, CA (US)

( * ) Notice: Subject to any disclaimer, the term of this patent is extended or adjusted under 35 U.S.C. 154(b) by 886 days.

(21) Appl. No.: 13/468,350

(22) Filed: May 10, 2012

(65) Prior Publication Data

US 2012/0222128 A1 Aug. 30, 2012

Related U.S. Application Data

(63) Continuation of application No. 11/756,852, filed on Jun. 1, 2007, now Pat. No. 8,185,830.

(60) Provisional application No. 60/835,861, filed on Aug. 7, 2006, provisional application No. 60/863,600, filed on Oct. 31, 2006.

(51) Int. Cl.
*G06F 3/00* (2006.01)
*G06F 17/30* (2006.01)

(52) U.S. Cl.
CPC ................ *G06F 17/3089* (2013.01)

(58) Field of Classification Search
None
See application file for complete search history.

(56) References Cited

U.S. PATENT DOCUMENTS

| | | |
|---|---|---|
| 5,179,657 A | 1/1993 | Dykstal et al. |
| 5,470,233 A | 11/1995 | Fruchterman et al. |
| 5,537,526 A | 7/1996 | Anderson et al. |
| 5,581,686 A | 12/1996 | Koppolu et al. |
| 5,613,058 A | 3/1997 | Koppolu et al. |
| 5,634,019 A | 5/1997 | Koppolu et al. |
| 5,636,346 A | 6/1997 | Saxe |
| 5,640,579 A | 6/1997 | Koppolu et al. |
| 5,724,521 A | 3/1998 | Dedrick |
| 5,754,175 A | 5/1998 | Koppolu et al. |

(Continued)

FOREIGN PATENT DOCUMENTS

| | | |
|---|---|---|
| EP | 1 026 610 | 8/2000 |
| EP | 1415245 | 2/2011 |

(Continued)

OTHER PUBLICATIONS

Anonymous: "Translating WordPress—WordPress Codex", May 25, 2006 (May 25, 2006), pp. 1-20, Retrieved from the Internet: URL:http://web.archive.org/web/20060525014517/http://codex.wordpress.org/Translating_WordPress,[retrieved on Jun. 21, 2011].

(Continued)

*Primary Examiner* — Thanh Vu
(74) *Attorney, Agent, or Firm* — Fish & Richardson P.C.

(57) ABSTRACT

A computer-implemented system and method to distribute a content document with security, customization, and scalability is provided. One or more servers provides a customizable content document associated with a first entity, enables a second entity to specify content to be included for users associated with the entity in the customizable content document, and delivers the customized content document incorporating the specified content in a secure manner to users associated with the second entity.

42 Claims, 24 Drawing Sheets

(56) References Cited

U.S. PATENT DOCUMENTS

| | | | |
|---|---|---|---|
| 5,801,701 A | 9/1998 | Koppolu et al. | |
| 5,812,862 A | 9/1998 | Smith et al. | |
| 5,835,919 A | 11/1998 | Stern et al. | |
| 5,845,265 A | 12/1998 | Woolston | |
| 5,845,281 A | 12/1998 | Benson et al. | |
| 5,905,492 A | 5/1999 | Straub et al. | |
| 5,910,804 A | 6/1999 | Fortenbery et al. | |
| 5,918,010 A | 6/1999 | Appleman et al. | |
| 5,920,854 A | 7/1999 | Kirsch et al. | |
| 5,931,901 A | 8/1999 | Wolfe et al. | |
| 5,974,398 A | 10/1999 | Hanson et al. | |
| 5,991,807 A * | 11/1999 | Schmidt et al. | 709/225 |
| 6,009,442 A | 12/1999 | Chen et al. | |
| 6,026,368 A | 2/2000 | Brown et al. | |
| 6,044,375 A | 3/2000 | Shmueli et al. | |
| 6,061,659 A | 5/2000 | Murray | |
| 6,067,570 A | 5/2000 | Kreynin et al. | |
| 6,078,866 A | 6/2000 | Buck et al. | |
| 6,134,552 A | 10/2000 | Fritz et al. | |
| 6,205,476 B1 * | 3/2001 | Hayes, Jr. | G06F 9/44505 709/208 |
| 6,223,163 B1 | 4/2001 | Van Luchene | |
| 6,229,539 B1 | 5/2001 | Morcos | |
| 6,247,009 B1 | 6/2001 | Shiiyama et al. | |
| 6,253,189 B1 | 6/2001 | Feezell et al. | |
| 6,269,361 B1 | 7/2001 | Davis et al. | |
| 6,285,987 B1 | 9/2001 | Roth et al. | |
| 6,298,348 B1 | 10/2001 | Eldering | |
| 6,324,519 B1 | 11/2001 | Eldering | |
| 6,327,628 B1 | 12/2001 | Anuff et al. | |
| 6,336,132 B2 | 1/2002 | Appleman et al. | |
| 6,396,515 B1 | 5/2002 | Hetherington et al. | |
| 6,397,231 B1 | 5/2002 | Salisbury et al. | |
| 6,421,675 B1 | 7/2002 | Ryan et al. | |
| 6,430,688 B1 | 8/2002 | Kohl et al. | |
| 6,473,800 B1 | 10/2002 | Jerger et al. | |
| 6,601,057 B1 | 7/2003 | Underwood et al. | |
| 6,609,123 B1 * | 8/2003 | Cazemier et al. | |
| 6,610,105 B1 | 8/2003 | Martin et al. | |
| 6,677,894 B2 | 1/2004 | Sheynblat et al. | |
| 6,677,968 B1 | 1/2004 | Appelman | |
| 6,681,371 B1 | 1/2004 | Devabu | |
| 6,691,114 B1 | 2/2004 | Nakamura | |
| 6,813,640 B1 | 11/2004 | Benson et al. | |
| 6,826,572 B2 | 11/2004 | Colace et al. | |
| 6,912,532 B2 | 6/2005 | Andersen et al. | |
| 6,976,210 B1 | 12/2005 | Silva et al. | |
| 7,089,248 B1 | 8/2006 | King et al. | |
| 7,103,642 B1 | 9/2006 | Chen et al. | |
| 7,167,903 B2 | 1/2007 | Percival | |
| 7,234,107 B1 | 6/2007 | Aoki et al. | |
| 7,257,604 B1 | 8/2007 | Wolfe | |
| 7,281,060 B2 | 10/2007 | Hofmann et al. | |
| 7,290,006 B2 | 10/2007 | Xie et al. | |
| 7,330,967 B1 * | 2/2008 | Pujare et al. | 713/2 |
| 7,376,907 B2 | 5/2008 | Santoro et al. | |
| 7,395,322 B2 | 7/2008 | Harvey et al. | |
| 7,406,510 B1 | 7/2008 | Feldman | |
| 7,441,185 B2 | 10/2008 | Coulson et al. | |
| 7,490,295 B2 | 2/2009 | Chaudhri et al. | |
| 7,542,951 B1 | 6/2009 | Chakrabarti et al. | |
| 7,653,721 B1 | 1/2010 | Romanov et al. | |
| 7,693,863 B2 | 4/2010 | Martin et al. | |
| 7,725,530 B2 | 5/2010 | Sah et al. | |
| 7,730,082 B2 | 6/2010 | Sah et al. | |
| 7,730,109 B2 | 6/2010 | Rohrs et al. | |
| 8,051,385 B1 | 11/2011 | Yawitz et al. | |
| 8,069,407 B1 | 11/2011 | Armandpour | |
| 8,185,819 B2 | 5/2012 | Sah et al. | |
| 8,185,830 B2 | 5/2012 | Saha et al. | |
| 8,281,390 B1 | 10/2012 | Shah et al. | |
| 8,291,390 B2 | 10/2012 | Shah et al. | |
| 8,407,250 B2 | 3/2013 | Saha et al. | |
| 2001/0042064 A1 | 11/2001 | Davis et al. | |
| 2001/0047297 A1 | 11/2001 | Wen | |
| 2001/0051911 A1 | 12/2001 | Marks et al. | |
| 2002/0002509 A1 | 1/2002 | Wagorn et al. | |
| 2002/0002525 A1 | 1/2002 | Arai et al. | |
| 2002/0005867 A1 | 1/2002 | Gvily | |
| 2002/0023158 A1 | 2/2002 | Polizzi et al. | |
| 2002/0026359 A1 | 2/2002 | Long et al. | |
| 2002/0031230 A1 | 3/2002 | Sweet et al. | |
| 2002/0035536 A1 | 3/2002 | Gellman | |
| 2002/0038282 A1 | 3/2002 | Montgomery | |
| 2002/0046099 A1 | 4/2002 | Frengut et al. | |
| 2002/0046104 A1 | 4/2002 | Kaddeche et al. | |
| 2002/0046245 A1 | 4/2002 | Hillar et al. | |
| 2002/0065878 A1 | 5/2002 | Paxhia et al. | |
| 2002/0077891 A1 | 6/2002 | Castle et al. | |
| 2002/0083073 A1 * | 6/2002 | Vaidya et al. | 707/102 |
| 2002/0087667 A1 | 7/2002 | Andersen | |
| 2002/0091736 A1 | 7/2002 | Wall | |
| 2002/0099605 A1 | 7/2002 | Weitzman et al. | |
| 2002/0111898 A1 | 8/2002 | Numaoka et al. | |
| 2002/0123988 A1 | 9/2002 | Dean et al. | |
| 2002/0143819 A1 | 10/2002 | Han et al. | |
| 2002/0147746 A1 * | 10/2002 | Lee | 707/513 |
| 2002/0152114 A1 | 10/2002 | Shumaker et al. | |
| 2002/0152197 A1 | 10/2002 | Stocker et al. | |
| 2002/0156812 A1 | 10/2002 | Krasnoiarov et al. | |
| 2002/0161667 A1 * | 10/2002 | Felkey et al. | 705/26 |
| 2002/0165773 A1 | 11/2002 | Natsuno et al. | |
| 2002/0184097 A1 | 12/2002 | Hijiri et al. | |
| 2002/0184343 A1 | 12/2002 | Ashcroft | |
| 2002/0194062 A1 | 12/2002 | Linide | |
| 2002/0198780 A1 | 12/2002 | Kawakami et al. | |
| 2003/0005297 A1 * | 1/2003 | Fichtner | G06F 21/6236 713/168 |
| 2003/0028896 A1 | 2/2003 | Swart et al. | |
| 2003/0037334 A1 | 2/2003 | Khoo et al. | |
| 2003/0050986 A1 * | 3/2003 | Matthews et al. | 709/206 |
| 2003/0055624 A1 | 3/2003 | Fletcher | |
| 2003/0055868 A1 | 3/2003 | Fletcher | |
| 2003/0067497 A1 | 4/2003 | Pichon | |
| 2003/0069868 A1 * | 4/2003 | Vos | 706/45 |
| 2003/0070167 A1 | 4/2003 | Holtz et al. | |
| 2003/0081017 A1 | 5/2003 | Shenassa et al. | |
| 2003/0083937 A1 | 5/2003 | Hasegawa et al. | |
| 2003/0115292 A1 * | 6/2003 | Griffin et al. | 709/219 |
| 2003/0117437 A1 | 6/2003 | Cook et al. | |
| 2003/0126136 A1 | 7/2003 | Omoigui | |
| 2003/0140316 A1 | 7/2003 | Lakritz | |
| 2003/0149618 A1 | 8/2003 | Sender et al. | |
| 2003/0163372 A1 | 8/2003 | Kolsy | |
| 2003/0216963 A1 | 11/2003 | Ishiwaka et al. | |
| 2003/0227482 A1 | 12/2003 | Bach et al. | |
| 2003/0236729 A1 | 12/2003 | Epstein et al. | |
| 2004/0002903 A1 | 1/2004 | Stolfo | |
| 2004/0015397 A1 | 1/2004 | Barry et al. | |
| 2004/0019523 A1 | 1/2004 | Barry et al. | |
| 2004/0019610 A1 | 1/2004 | Burns | |
| 2004/0024812 A1 | 2/2004 | Park et al. | |
| 2004/0044571 A1 | 3/2004 | Bronnimann et al. | |
| 2004/0054569 A1 * | 3/2004 | Pombo | G06Q 10/0633 705/7.27 |
| 2004/0054577 A1 | 3/2004 | Inoue et al. | |
| 2004/0054589 A1 | 3/2004 | Nicholas et al. | |
| 2004/0059708 A1 | 3/2004 | Dean et al. | |
| 2004/0059712 A1 | 3/2004 | Dean et al. | |
| 2004/0068554 A1 | 4/2004 | Bales et al. | |
| 2004/0083202 A1 | 4/2004 | Mu et al. | |
| 2004/0093327 A1 | 5/2004 | Anderson et al. | |
| 2004/0093620 A1 | 5/2004 | Lino et al. | |
| 2004/0098275 A1 * | 5/2004 | Hubert | 705/1 |
| 2004/0100488 A1 | 5/2004 | Kasper | |
| 2004/0119740 A1 | 6/2004 | Chang et al. | |
| 2004/0133660 A1 | 7/2004 | Junghuber et al. | |
| 2004/0139049 A1 | 7/2004 | Hancock et al. | |
| 2004/0143499 A1 | 7/2004 | Dietsch et al. | |
| 2004/0143843 A1 | 7/2004 | Khoo et al. | |
| 2004/0148576 A1 | 7/2004 | Matveyenko | |
| 2004/0150673 A1 | 8/2004 | Dobronsky | |
| 2004/0153508 A1 | 8/2004 | Alcorn et al. | |
| 2004/0167928 A1 | 8/2004 | Anderson et al. | |

(56) References Cited

U.S. PATENT DOCUMENTS

| | | |
|---|---|---|
| 2004/0183831 A1 | 9/2004 | Ritchy et al. |
| 2004/0205163 A1 | 10/2004 | Yagi |
| 2004/0205554 A1 | 10/2004 | Goswami et al. |
| 2004/0216034 A1 | 10/2004 | Lection et al. |
| 2004/0249709 A1 | 12/2004 | Donovan et al. |
| 2005/0015710 A1* | 1/2005 | Williams ............ G06F 17/3089 715/206 |
| 2005/0021765 A1 | 1/2005 | Flores et al. |
| 2005/0050021 A1 | 3/2005 | Timmons |
| 2005/0065806 A1 | 3/2005 | Harik |
| 2005/0071224 A1 | 3/2005 | Fikes et al. |
| 2005/0080898 A1 | 4/2005 | Block |
| 2005/0085272 A1 | 4/2005 | Anderson et al. |
| 2005/0086073 A1 | 4/2005 | Rodes et al. |
| 2005/0096979 A1 | 5/2005 | Koningstein |
| 2005/0097180 A1 | 5/2005 | Abdelhak |
| 2005/0101311 A1 | 5/2005 | Weitzman et al. |
| 2005/0108574 A1 | 5/2005 | Haenel |
| 2005/0120288 A1 | 6/2005 | Boehme et al. |
| 2005/0131758 A1 | 6/2005 | Desikan et al. |
| 2005/0131762 A1 | 6/2005 | Bharat et al. |
| 2005/0138640 A1 | 6/2005 | Fresko |
| 2005/0144069 A1 | 6/2005 | Wiseman et al. |
| 2005/0159970 A1* | 7/2005 | Buyukkokten et al. .......... 705/1 |
| 2005/0160356 A1 | 7/2005 | Albornoz et al. |
| 2005/0183026 A1 | 8/2005 | Amano et al. |
| 2005/0198120 A1 | 9/2005 | Reshef et al. |
| 2005/0198615 A1 | 9/2005 | Choi et al. |
| 2005/0216335 A1 | 9/2005 | Fikes et al. |
| 2005/0216823 A1 | 9/2005 | Petersen et al. |
| 2005/0222900 A1 | 10/2005 | Fuloria et al. |
| 2005/0222903 A1 | 10/2005 | Buchheit et al. |
| 2005/0222989 A1 | 10/2005 | Haveliwala et al. |
| 2005/0223002 A1 | 10/2005 | Agarwal et al. |
| 2006/0015817 A1 | 1/2006 | Fioretti et al. |
| 2006/0041548 A1 | 2/2006 | Parsons et al. |
| 2006/0041637 A1 | 2/2006 | Jerrard-Dunne |
| 2006/0048068 A1 | 3/2006 | Danninger |
| 2006/0074913 A1 | 4/2006 | O'Sullivan et al. |
| 2006/0089912 A1 | 4/2006 | Spagna et al. |
| 2006/0095676 A1 | 5/2006 | Dzierzon |
| 2006/0117016 A1* | 6/2006 | Smith ....................... G06F 21/62 |
| 2006/0123230 A1 | 6/2006 | Hewett et al. |
| 2006/0129935 A1 | 6/2006 | Deinlein et al. |
| 2006/0136587 A1 | 6/2006 | Allamaraju |
| 2006/0173985 A1 | 8/2006 | Moore |
| 2006/0174277 A1* | 8/2006 | Sezan et al. ..................... 725/46 |
| 2006/0218133 A1 | 9/2006 | Atkin et al. |
| 2006/0259860 A1 | 11/2006 | Kobashi |
| 2007/0002057 A1* | 1/2007 | Danzig ................... A63F 13/12 345/473 |
| 2007/0006069 A1 | 1/2007 | Smith et al. |
| 2007/0016867 A1 | 1/2007 | Nickell et al. |
| 2007/0055748 A1 | 3/2007 | Kim et al. |
| 2007/0083670 A1 | 4/2007 | Kelley et al. |
| 2007/0101285 A1 | 5/2007 | Mohr |
| 2007/0106803 A1 | 5/2007 | Peterson et al. |
| 2007/0136201 A1 | 6/2007 | Sah et al. |
| 2007/0136320 A1 | 6/2007 | Sah et al. |
| 2007/0136337 A1 | 6/2007 | Sah et al. |
| 2007/0136443 A1 | 6/2007 | Sah et al. |
| 2007/0162842 A1 | 7/2007 | Ambachtsheer et al. |
| 2007/0162845 A1 | 7/2007 | Cave et al. |
| 2007/0192700 A1 | 8/2007 | Sengar |
| 2007/0204010 A1 | 8/2007 | Sah et al. |
| 2007/0282877 A1* | 12/2007 | Fischer et al. ................ 707/101 |
| 2007/0288488 A1 | 12/2007 | Rohrs et al. |
| 2008/0010345 A1 | 1/2008 | Curtis et al. |
| 2008/0010387 A1 | 1/2008 | Curtis et al. |
| 2008/0033956 A1 | 2/2008 | Saha et al. |
| 2008/0034309 A1 | 2/2008 | Louch et al. |
| 2008/0034441 A1 | 2/2008 | Saha et al. |
| 2008/0082907 A1 | 4/2008 | Sorotokin et al. |
| 2009/0006996 A1 | 1/2009 | Saha et al. |
| 2009/0037935 A1 | 2/2009 | Saha et al. |
| 2009/0204914 A1 | 8/2009 | King et al. |
| 2009/0288025 A1 | 11/2009 | King et al. |
| 2012/0221942 A1 | 8/2012 | Sah et al. |
| 2013/0018997 A1 | 1/2013 | Saha et al. |

FOREIGN PATENT DOCUMENTS

| | | |
|---|---|---|
| WO | 00/38074 | 6/2000 |
| WO | 00/75840 | 12/2000 |
| WO | 2004/042525 | 5/2004 |

OTHER PUBLICATIONS

Office Action issued in European Application No. 07795764.5 on Feb. 2, 2015, 7 pages.

Abdelnur, Alejandro et al., Java Portlet Specification, version 1.0, JCP Program Management Office, Oct. 7, 2003, pp. 1-132, XP002631612, retrieved from the internet at http://jcp.org/aboutJava/communityprocess/final/jsr1168/index.html on Apr. 6, 2011, pp. 123.

Braun, Chris et al., "Web Services for Remote Portlets Specification Version 1.0", The Organization for the Advancement of Structured Information Standards (OASIS), Sep. 3, 2003, XP002631614, retrieved from the internet at http://www.oasis-2000304-wsrp-spedification-1.0.pdf on Apr. 6, 2011, pp. 86.

Parkin, Stephanie, "Rapid Java and J2EE Development with IBM WebSphere Studio and IBM Rational Developer", IBM Software Group, Oct. 2004, XP002631615, retrieved from the internet at http://s7.compdfs/wp-radrwd-medres.pdf on Apr. 6, 2011, pp. 44.

HTML Techniques for Web Content Accessibility Guidelines 1.0, W3C Note Nov. 6, 2000, retrieved from the internet at http://www.w3.org/TR/WCAG10-HTML-TECHS/ on Oct. 19, 2011, pp. 53.

Start, "Start.com Developer Center: Updates and Events", retrieved from the internet at <http://start.com/developer/default.htm, retrieved from the internet on May 23, 2006; 2 pgs.

Start, "Start.com Developer Center: Getting Started with Start.com Gadgets", retrieved from the internet at <http://start.com/developer/gettingstarted.aspx, retrieved from the internet on May 23, 2006; 2 pgs.

Start, "Start.com Developer Center: Atlas Runtime Reference", retrieved from the internet at <http://start.com/developer/atlasruntime.aspx, retrieved from the internet on May 23, 2006; 6 pgs.

Start, "Start.com Developer Center: Bindings Reference", retrieved from the internet at <http://start.com/developer/binding_ref.aspx, retrieved from the internet on May 23, 2006; 11 pgs.

Techcrunch, "Profile—MSN Start.com", retrieved from the internet at <http://www.techcrunch.com/tag/Start.com/, dated Aug. 3, 2005 retrieved from the internet on May 10, 2006; 3 pgs.

Richard Macmanus, "Microsoft's Start.com Opens Up", retrieved from the internet at <http://blogs.zdnet.com/web2explorer/?p=9, dated Sep. 14, 2005, retrieved from the internet on May 23, 2006; 4 pgs.

Yahoo!, "Widgets—Information", retrieved from the internet at <http://widgets.yahoo.com/info, retrieved from the internet on May 23, 2006; 2 pgs.

Yahoo!, "Widgets—FAQ", retrieved from the internet at <http://widgets.yahoo.com/faq/, retrieved from the internet on May 23, 2006; 4 pgs.

Yahoo!, "Widgets—Basics", retrieved from the internet at <http:widgets.yahoo.com/basics/, retrieved from the internet on May 23, 2006; 4 pgs.

Yahoo!, "Widgets—Version History", retrieved from the internet at <http://widgets.yahoo.com/versionhistory/, retrieved from the internet on May 23, 2006; 11 pgs.

Yahoo!, "Konfabulator—Gallery", retrieved from the internet at <http://www.widgetgallery.com, retrieved from the internet on May 23, 2006; 3 pgs.

Michael Arrington, "Profile—Konfabulator/ Yahoo Widgets", retrieved from the internet at <http://www.techcrunch.com/tag/Konfabulator/, dated Jul. 26, 2005, retrieved from the internet on May 10, 2006; 6 pgs.

(56) References Cited

OTHER PUBLICATIONS

Apple, "Dashboard: Handy Widgets at your Command", retrieved from the internet at <http://www.apple.com/macosx/features/dashboard/, retrieved from the internet on May 23, 2006; 4 pgs.
Apple, "Featured Widget: Art Directors Toolkit Widget", retrieved from the internet at <http://www.apple.com/downloads/dashboard/, dated May 17, 2006, retrieved from the internet on May 23, 2006; 3 pgs.
Apple Computer, Inc., "Tiger Developer Overview Series: Developing Dashboard Widgets", retrieved from the internet at <http://developer.apple.corn/macosx/dashboard.html, retrieved from the internet on May 23, 2006; 11 pgs.
Dashboard Exposed, "Newest Widgets", retrieved from the internet at <http:www.dashboardexposed.com/index/sitelinks-newest-action, retrieved from the internet on May 23, 2006; 5 pgs.
Bryan Castle, "Introduction to Web Services for Remote Portlets", retrieved from the internet at <http://www-128.ibm.com,developerworks/library/ws-wsrp/, dated Apr. 15, 2005, retrieved from the internet on May 23, 2006; 8 pgs.
Sun Microsystems, Inc., "Introduction to JSR 168—The Portlet Specification", retrieved from the internet at<http://developers.sun.com/prodtech/portalserver/reference/techart/jsr168/, dated Jul. 17, 2003, retrieved from the internet on May 23, 2006; 3 pgs.
Ron Lynn, et al., "Creating a JSR 168 Portlet for Use by Diverse Portals using Web Services for Remote Portlets", retrieved from the internet at <http://www-128.ibm.com/developerworks/websphere/library/tutorials/0510_lynn/0510_lyn . . . , dated Oct. 26, 2005, retrieved from the internet on May 10, 2006; 2 pgs.
"JSR 168, WSRP, Portlets & Enterprise Portal", retrieved from the internet at <http://portlets.blogspot.com/, dated May 17, 2006, retrieved from the internet on May 23, 2006; 18 pgs.
Daniel Rubio, "Web Services, portlets and WSRP", retrieved from the internet at <http://searchwebservices.techtarget.com/tip/1,289483,sid26_gci1134722,00.html, dated Oct. 18, 2005, retrieved from the internet on May 23, 2006; 6 pgs.
Apple, "Exposé: Find the window you need. Now.", retrieved from the internet at <http://www.apple.com/macosx/features/expose/, retrieved from the internet on May 23, 2006; 2 pgs.
Google Introduces New Pricing for Popular Self-Service Online Advertising Program, http://www.google.com/press/pressrel/select.html, p. 1-2, dated Feb. 20, 2002, printed on Jul. 29, 2003; 2 pgs.
Collection of pages from www.overture.com, printed on Jul. 29, 2003; 4 pgs.
Collection of pages from findwhat.com, http://www.findwhat.com, printed on Jul. 29, 2003; 50 pgs.
Collection of pages from Sprinks.com, http://www.sprinks.com, printed on Jul. 29, 2003; 11 pgs.
Collection of pages from Kandoodle.com, http://www.kanoodle.com, printed on Jul. 29, 2003; 5 pgs.
Collection of pages from Google Advertising, http://www.google.com, printed on Jul. 29, 2003; 80 pgs.
Chris Sherman, "Google Launches AdWords Select," Feb. 20, 2002, 6 pages.
Notification of Transmittal of the International Search Report and the Written Opinion of the International Search Authority, or the Declaration (4 pages); Written Opinion of the International Searching Authority (6 pages), and International Search Report (2 pages) for International Application No. PCT/US 06/46976 mailed Mar. 13, 2008.
Notification of Transmittal of the International Search Report and the Written Opinion of the International Search Authority, or the Declaration (4 pages); Written Opinion of the International Searching Authority (4 pages), and International Search Report (2 pages) for International Application No. PCT/US 06/46974 mailed Mar. 13, 2008.
Notification of Transmittal of the International Search Report and the Written Opinion of the International Search Authority, or the Declaration (4 pages); Written Opinion of the International Searching Authority (5 pages), and International Search Report (2 pages) for International Application No. PCT/US 06/46975 mailed Mar. 13, 2008.
Notification of Transmittal of the International Search Report and the Written Opinion of the International Search Authority, or the Declaration (4 pages); Written Opinion of the International Searching Authority (5 pages), and International Search Report (2 pages) for International Application No. PCT/US 06/46973 mailed Mar. 13, 2008.
Notification of Transmittal of the International Search Report and the Written Opinion of the International Search Authority, or the Declaration (4 pages); Written Opinion of the International Searching Authority (3 pages), and International Search Report (2 pages) for International Application No. PCT/US 07/10788 mailed Jul. 23, 2008.
Notification of Transmittal of the International Search Report and the Written Opinion of the International Search Authority, or the Declaration (3 pages); Written Opinion of the International Searching Authority (3 pages), and International Search Report (2 pages) for International Application No. PCT/US 07/13261 mailed Jul. 7, 2008.
Notification of Transmittal of the International Search Report and the Written Opinion of the International Searching Authority, or the Declaration (4 pages), Written Opinion of the International Searching Authority (3 pages), and International Search Report (2 pages) for International Application No. PCT/US07/17502 mailed Jul. 17, 2008.
Notification of Transmittal of the International Search Report and the Written Opinion of the International Searching Authority, or the Declaration (1 page), International Search Report (3 pages), and Written Opinion of the International Searching Authority (8 pages) for International Application No. PCT/US07/17503 mailed Sep. 16, 2008 (Total 12 Pages).
Julio Ojeda-Zapata. "Wild about widgets: Tiny computer programs are 'where the Web and the desktop meet.'" Knight Ridder Tribune News Service. Aug. 24, 2005. ProQuest Newsstand, ProQuest Web. Sep. 13, 2009.
Datta et al., Accelerating dynamic Web content generation, Sep.-Oct. 2002, IEEE, vol. 6, 27-26.
Geigel et al., Using genetic algorithms for album page layouts, Oct.-Dec. 2003, IEEE,vol. 10, 16-27.
Krieger et al, The emergence of distributed component platforms, Mar. 1998, IEEE, 43-53.
Thomas Schaeck. Web Services for Remote Portals (WSRP) Whitepaper, Sep. 22, 2002, 1-18.
Summons to Attend Oral Proceedings issued in European Application No. 07836554.1, mailed on Mar. 15, 2017, 9 pages.

* cited by examiner

| Save Now | Preview  Draft saved at 5:03 pm. |

| Layout | Colors | Header and Footer | Page Content | Additional Content | Publish |

Customize the directory of additional sections users can add to their pages

Customize the directory of additional content users can add to their homepages. Learn about homepage content Click section titles to preview the sections. Uncheck sections you do *not* want listed in the directory. Unchecked sections will remain available through search.

Directory Contents   Select all  Select none

- ▼ ☑ News
  - ☑ The Guardian Unlimited
  - ☑ BBC
  - ☑ CNN
  - ☑ Le Monde
- ▼ ☑ Business
  - ☑ The Guardian Unlimited
  - ☑ BBC
  - ☑ CNN
  - ☑ Le Monde
- ▼ ☑ Entertainment
  - ☑ Entertainment Weekly
  - ☑ Teen People
  - ☑ Movie Showtimes
- ▼ ☑ Business
  - ☑ The Guardian Unlimited
  - ☑ BBC
  - ☑ CNN
  - ☑ Le Monde
- ▼ ☑ Entertainment
  - ☑ Entertainment Weekly
  - ☑ Teen People
  - ☑ Movie Showtimes ⊕ Create a custom section
Do you have news, games, announcements, or other stuff you'd like your users to easily add to their homepage? Create a custom section to add to the content directory.

CONFIGURING A CONTENT DOCUMENT FOR USERS AND USER GROUPS

CROSS-REFERENCE TO RELATED APPLICATIONS

This application is a continuation of and claims priority to U.S. application Ser. No. 11/756,852, filed on Jun. 1, 2007 now U.S. Pat. No. 8,185,830, U.S. Provisional Application Ser. No. 60/835,861, filed Aug. 7, 2006, and U.S. Provisional Application Ser. No. 60/863,600 filed Oct. 31, 2006, the entire contents of which is incorporated by reference for all purposes.

This application claims the benefit of U.S. Provisional Application Ser. No. 60/835,861, filed Aug. 7, 2006 and U.S. Provisional Application Ser. No. 60/863,600 filed Oct. 31, 2006.

BACKGROUND

Embodiments of the present invention relate to digital data processing for serving content over a network.

Portals enable users to personalize content on the portal. Portals are offered from a portal developer directly to an end user, and do not provide a means for a third party to add value. Portals cannot be easily mass-produced in a customizable way for large numbers of portal providers. Moreover, the content that a portal permits an end user to incorporate is usually limited and specified by the portal provider.

These and other drawbacks exist with current systems.

SUMMARY

The present specification discloses various embodiments of technologies for a third-party service of securely serving arbitrarily selectable and dynamic content to users on a scalable basis. Embodiments feature methods, systems, apparatus, including computer program product apparatus.

Accordingly, various exemplary embodiments of the present inventions may be directed to a method that includes providing a customizable content document associated with a first entity, enabling a second entity to specify content to be included for users associated with the entity in the customizable content document, and delivering the customized content document incorporating the specified content in a secure manner to users associated with the second entity.

Various exemplary embodiments may also be directed to a method that includes receiving one or more selections associated with a user group, and serving a user a container document. In these embodiments, the one or more selections identify content to be served to users associated with the user group for one or more container documents and the container document includes content identified by the one or more selections for the user group with which a user is associated. Also, the content is incorporated securely into the container document.

Various exemplary embodiments may also be directed to a method that includes receiving one or more selections associated with a user group, and transmitting the selections to a container server system that serves a container document to users of the user group based on a request for the content. In these embodiments, the one or more selections identify content to be served to users associated with the user group for one or more container documents.

Various exemplary embodiments may also be directed to a system that serves content in a container document. The system includes a server to receive a request for a container document, determine whether the request is for a container document associated with a user group, request configuration information from a configuration server based on a determination that the request is for a container document associated with a user group, receive the configuration information from the configuration server, and serve the requested container document using the configuration information. In these embodiments, the configuration server enables configuration of at least a portion of a container document and the container document is associated with a user group.

Various exemplary embodiments may also be directed to a method that includes receiving a request for a container document, determining whether the request is for a container document associated with a user group, requesting configuration information based on a determination that the request is for a container document associated with a user group, receiving the configuration information, and serving the container document using the configuration information. In these embodiments, the configuration information defines at least a portion of the container document associated with the user group.

Various exemplary embodiments may also be directed to a method that includes receiving a request for a container document, determining whether the request is for a container document associated with a user group, determining whether a requestor of the request is associated with a level of status within the user group among a plurality of levels of status within the user group, determining the level of status of the requestor based on a determination that the requestor is associated with a level of status within the user group, requesting configuration information based on a determination that the container document is associated with a user group and the level of status, receiving the configuration information, and serving the container document using the configuration information.

Various exemplary embodiments may also be directed to a method that includes receiving a request for a container document, determining whether the request is for a container document associated with a user group, determining a location associated with the request, requesting configuration information based on a determination that the container document is associated with a user group and the location, receiving the configuration information, and serving the container document using the configuration information.

Various exemplary embodiments may also be directed to a system that serves content in a container document. This system includes a server to receive a request for a container document, determine whether the request is for a container document associated with a user group, determine whether a requestor of the request is associated with a level of status within the user group among a plurality of levels of status within the user group, determine the level of status of the requestor based on a determination that the requestor is associated with a level of status within the user group, request configuration information from a configuration server based on a determination that the request is for a container document associated with a user group and the level of status, receive the configuration information from the configuration server, and serve the requested container document using the configuration information. In these embodiments, the configuration server enables configuration of at least a portion of a container document, and the container document is associated with a user group.

Various exemplary embodiments may also be directed to a system that serves content in a container document. This system includes a server to receive a request for a container document, determine whether the request is for a container document associated with a user group, determine a location associated with the request, request configuration information from a configuration server based on a determination that the request is for a container document associated with a user group and the location, receive the configuration information from the configuration server, and serve the requested container document using the configuration information. In these embodiments, the configuration server enables configuration of at least a portion of a container document and the container document is associated with a user group.

Various exemplary embodiments may also be directed to a computer-accessible medium encoded with computer program code. The computer program code is effective to receive a request for a container document, determine whether the request is for a container document associated with a user group, determine whether a requestor of the request is associated with a level of status within the user group among a plurality of levels of status within the user group, determine the level of status of the requestor based on a determination that the requestor is associated with a level of status within the user group, request configuration information based on a determination that the container document is associated with a user group and the level of status, receive the configuration information, and serve the container document using the configuration information.

Various exemplary embodiments may also be directed to a computer-accessible medium encoded with computer program code. The computer program code is effective to receive a request for a container document, determine whether the request is for a container document associated with a user group, determine a location associated with the request, request configuration information based on a determination that the container document is associated with a user group and the location, receive the configuration information, and serve the container document using the configuration information.

Various exemplary embodiments may also be directed to a method that includes authenticating a user based on the user's association with a user group, providing the user with an application, receiving input from the user regarding configuring the container document associated with the user group, providing an actual representation of the container document to the user based on the received input, and publishing the container document. In these embodiments, the application enables the user to configure a container document associated with the user group.

Various exemplary embodiments may also be directed to a method that includes registering components of a user interface, registering events regarding configuration of a container document, associating registered components with registered events, receiving information associated with registered event that has occurred for one of the registered components, and providing the information associated with registered event to all other associated components. In these examples, the user interface is associated with configuring a container document of behalf of a user group.

Various exemplary embodiments may also be directed to a system that includes a device to register components of a user interface, register events regarding configuration of a container document, associate registered components with registered events, receive information associated with registered event that has occurred for one of the registered components from the user interface, and provide the information associated with registered event to all other associated components.

Other embodiments may be considered.

BRIEF DESCRIPTION OF THE DRAWINGS

FIG. 13 depicts an illustrative application interface according to various embodiments of the present invention.

FIG. 21 depicts an illustrative application interface according to various embodiments of the present invention.

DETAILED DESCRIPTION

Overview of the Third Party Service

Figure 1A:
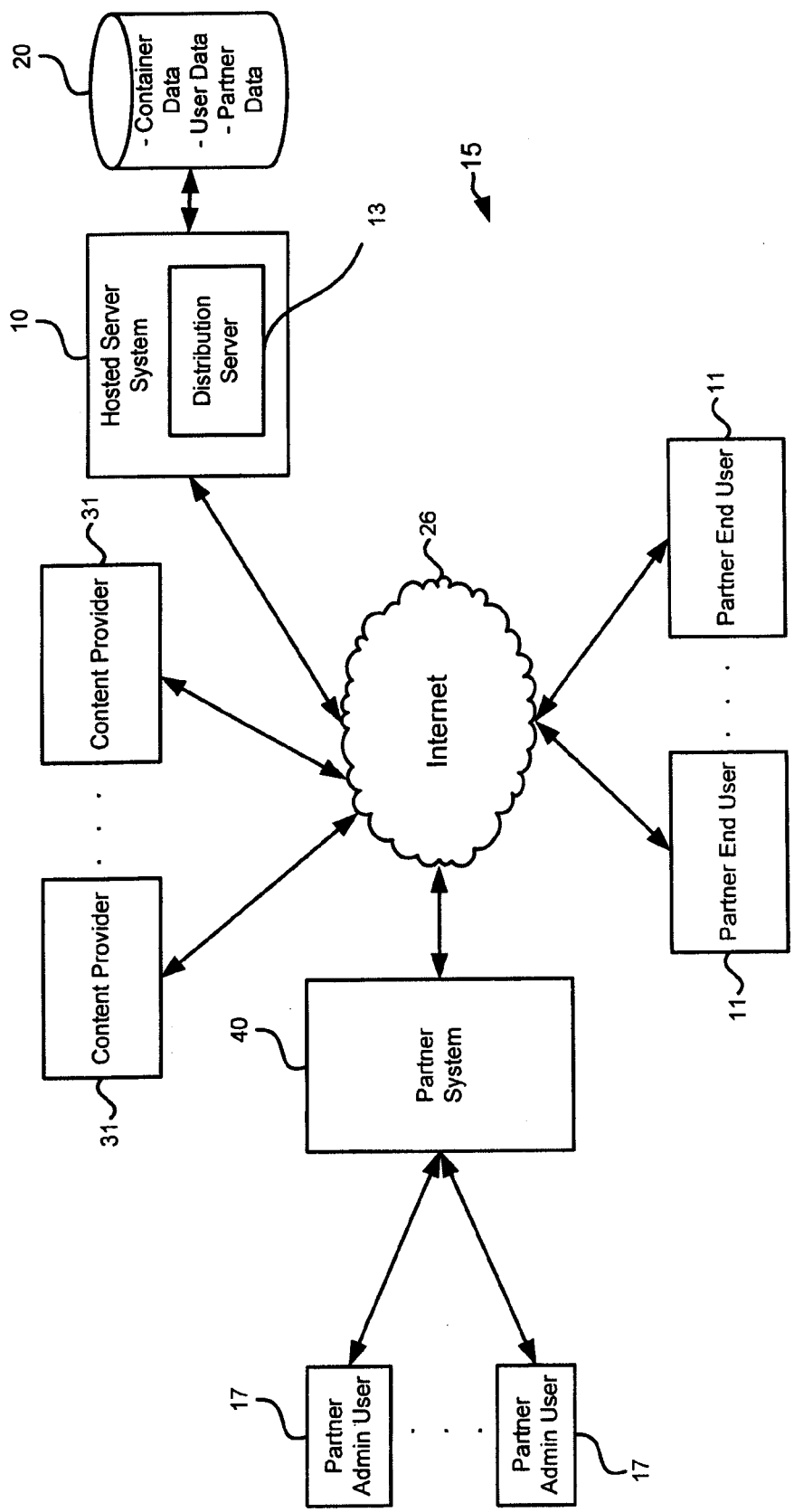
FIG. 1(a) depicts an overview of participating entities in a system and method provided according to various embodiments of the present invention.

One embodiment of the present invention involves a third party service of securely serving arbitrarily selectable and dynamic content to users on a scalable basis. For example, the one embodiment involves four kinds of entities: (1) a hosted server system (e.g., Google's Personalized Home Page Server) that distributes a highly configurable, dynamic and secure container document (e.g., a portal page such as Google's Personalized Home Page) to partners or other user groups; (2) partners, wherein each partner provides configuration through selection of arbitrary and dynamic content that it wants its users to see in the container document and enables its end users to further customize the content; (3) end users associated with a partner that may select further customizations including additional arbitrary and dynamic content; and (4) content providers. These parties interact with the host server system in a secure and scalable way. The end users then receive from the scalable hosted server system a container document that has been configured according to the multiple levels of configuration and that includes the arbitrarily selected content (including both dynamic and static content) incorporated in a secure manner.

Features of the Service

Some of the features of this service and system include third party servicing, security, arbitrary selectability, dynamic content, scalability, multiple levels of configurability, and dynamic provision of container documents.

Third Party Servicing: The service may be considered a "third party service" in that a hosted server system (e.g., Google) acts as a third party with respect to (i) end users being served content (ii) an entity which specifies the content available to the end users, and (iii) content providers. The entity specifying content is typically a user group, such as a partner. When the term partner is used in the instant specification, it should be understood to apply equally to other user groups and when the term user group is used, it should be understood to apply to a partner as one example. A company and its customers are examples of the partner entity and end users, respectively. A university and its students are also examples of the partner entity and its end users. So, a company can provide a configured home page experience for its users and select the content it wants its users to see on that configured home page. It does so by leveraging the hosted server system's service of the container document. In other words, the partner may provide this service without providing the technology to output the configured home page that is provided by the hosted server system. As used in the instant specification, the term content provider refers to a source of information. Examples of a content provider include but are not limited to a provider of a module, a news feed, a source of traffic information, a source of financial information, and/or a source of entertainment information.

Security: The container document may be secure despite the arbitrarily selectable and dynamic content (i.e., the hosted server system does not limit the initial selections made by the third party or users). For example, a partner may select a module created by an entity unknown to the hosted server system. The hosted server system may render a container document that includes the unknown entity's module by implementing security features to avoid having to approve each module ahead of its selection. Security may be implemented by compartmentalization, encapsulation (e.g., through the use of IFRAME techniques as described in more detail below) and/or input filtering (e.g., blacklisting, whitelisting, etc. of content). In this context, compartmentalization involves limiting the impact of an attack by a malicious or vulnerable (e.g., unsafe) partner or end user to the customized container documents associated with the partner or end user and not other compartments or accounts available from the system associated with the same login or identity used to access the customized container document.

Compartmentalization is a key component of the security because the security of the third party is not compromised despite the fact that the content is arbitrarily selectable and dynamic. If the user authentication is compromised, e.g. by a malicious partner or due to a partner vulnerability (XSS, etc.), then only the user's personalized page is compromised. The attacker can't gain access to the user's search history or email messages or other "compartments," even after a successful attack. The security features implemented enable the partner and its users to configure their experience while leveraging the hosted server system's platform.

Arbitrary Selectability: The security features described enable the system to permit arbitrary selection of content. The partner entity and associated users may select, from any content provider (e.g., sources including the hosted server system, the third party and/or other sources of content) content to be made available for serving to users associated with the partner entity. A partner may choose to limit the selections available to its end users or not. The system may avoid use of a pre-approved list of content providers in this way. Content may be of a wide variety of input types as well, as detailed below.

Dynamic Content: The content selected may be dynamic content, static content or both. The content may also be programmatic.

Scalability: The hosted server system provides this service from a scalable platform achieved, for example, through segmenting data for use with a non-relational database server. This solution balances scale and ease of data coherency. Certain types of non-relational data storage systems allow massively scalable write operations. For example, a database that does not provide transaction or locking support while storing time-series data with entries is not considered a relational database because an entry for the relation (Column1Value, Column2Value, . . . ) is not unique, but rather a time series. By using such a non-relational database, the system may become massively scalable. Most write operations to shared data are initiated from a small set of users (one or a few partner administrators), while read operations are initiated widely (e.g., each time an end-users requests a page, the template for an associated container document may be loaded). Scalability may also be achieved using a traditional relational database, highly replicated for scalable read operations, with master failover to enable high availability. Using this approach may increase overhead and add complexity and latency to the system.

Nevertheless, a simple non-relational storage system as described above enables a system and service for distributing configurable container documents to perform well on a massive scale. Such a system and service involves centralized writing and decentralized reads, high throughput (scalability and simplicity) and high availability (supporting failover). The database structure described enables implementation at much lower cost (fewer servers needed at a given scale) than other alternatives such as the highly-replicated relational database example.

Multiple Levels of Configurability: The content served may be configured by the partner/user group, which configuration can specify constraints under which end users associated with the entity may further configure the content.

Dynamic Provision of Container Documents: Partner/user groups may select a uniquely indexed partner domain that may be stored in a dynamic table by the hosted server system. By storing this uniquely indexed partner domain, the hosted server system may dynamically provide container documents associated with a partner/user group in a highly scalable manner.

Exemplary embodiments of the invention are discussed in detail below. While specific exemplary embodiments are discussed, it should be understood that this is done for illustration purposes only. A person skilled in the relevant art will recognize that other components and configuration can be used without departing from the spirit and scope of the invention.

Advantages of the Service

Some of the advantages this service provides include that an entity (e.g., partner or user group) such as a corporation, university club, merchant, service provider, etc. may effect its branding scheme using the service while not having to serve the content. It provides tremendous flexibility in what content is served to users associated with the entity. The service also provides the entity with a mechanism to offer a unique content offering to their the users associated with the entity.

Also, the entity using this service converts a cost center into a profit center. An entity, such as a corporation, usually pays to have content served to its customers. With the above-described service, the corporation turns a profit by including content that generates revenue, such as content that serves advertisements that pay those who serve the advertisements on various payment bases.

Also, the service is easy to use through an intuitive and easy-to-use interface by which a human operator associated with the partner entity (e.g., a representative) configures content, at either the entity level or the end user level.

Overview of a System and its Operation

FIG. 1(a) depicts an overview of various entities involved in this system and service. The service and system described may be implemented using a hosted server system 10 providing service to a partner system 40 over a network 26 (e.g., the Internet) in cooperation with one or more content providers 31. Partner system 40 may, through the use of partner admin users 17, provide selections and configurations to hosted server system 10 indicating a domain associated with the partner system, the authentication method for one or more partner end users, and the content to be provided in a container document served by hosted server system 10 to one or more partner end users 11.

The hosted server system 10 may operate with a distribution server 13 to distribute the service to one or more partner systems. A data storage system 20 may be provided that stores container data, user data, and partner data. That data may be used by hosted server system 10 to configure the container document for users based on configurations set up by the partner and, if provided, each partner end user 11. In general, partner admin users 17 have administrative rights whereas partner end users 11 do not. Partner admin users 17, can, for example, control the authentication methods for authenticating partner end users 11 and which content provider would be available for selection by partner end users 11 and, furthermore, the degree of configurability.

Figure 1B:
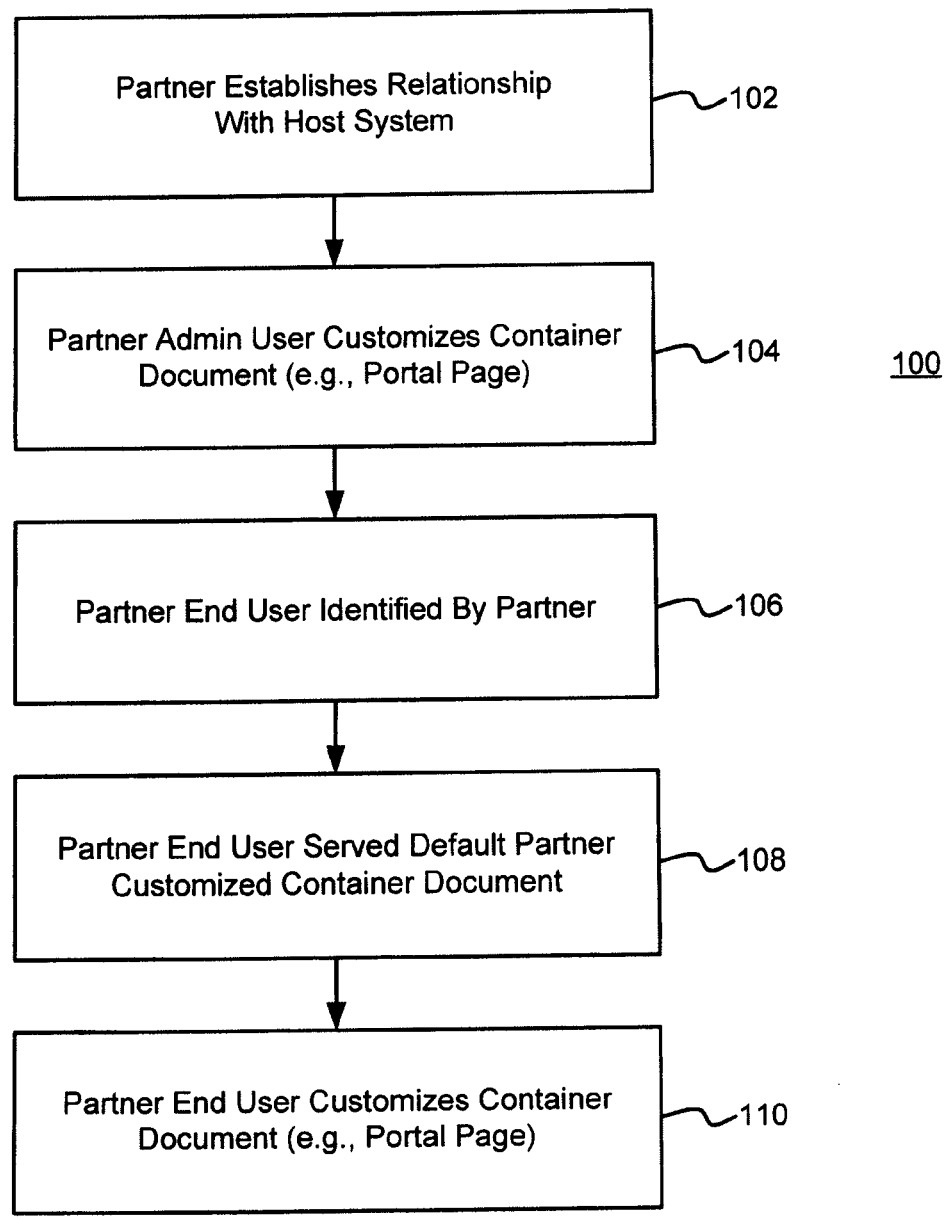
FIG. 1(b) depicts an illustrative process for obtaining customizations from users and user groups according to various embodiments of the present invention.

FIG. 1(b) provides a diagram illustrating actions that may be involved in this service. In block 102, a partner or user group establishes a relationship with the hosted server system. The partner may be a company, university, club or other organization that desires to provide a customized experience for its users. In block 104, a partner admin user may then configure the container document, such as an Internet portal page or personalized home page in a number of ways, all detailed below. Customization can include, for example, the partner's specification of constraints that one of its end users is subject to for selecting content and/or for configuring a personal Web page. Note that the partner can specify different constraints for different end users. The system may then make the configured container document available to users associated with the partner.

In block 106, partner end users may be identified by the partner to the host system in some way. Partner end users may include employees of a company, students of a university or other school, members of a club, subscribers to a service, etc. In block 108, a partner end user may be served a default partner-configured container document. This default partner-configured container document includes a first level of content and/or configurations that is selected by the partner to be served to its users. In block 110, an end user may provide configurations for the configured container document. This configured container document includes an additional level of content selections and/or configurations that are based on the end user's desires.

Specific Implementation Features

With the overall general framework in mind, there are a number of implementation features that may be included in this system and service including multiple levels of configuration, content freezing, incorporation of multiple types of modules, multiple channels of access to the configured container document, use of preferences and user identification to change content modules and content within modules, incorporation of search or other revenue generating modules, internationalization of modules, data driven container document implementations, use of subscription-based modules, modification of a default container document on the fly according to partner configurations, live preview of customizations and live updates to generated configured container documents. Each implementation feature is described below and in the more detailed explanations later in the document.

Multiple levels of configurations control the user experience: a partner may set one level of configuration and/or preference, including what modules are to be included in the default partner configured container document (e.g., the partner wants a weather module, a traffic module, a stock module and a calculator module), any values for inputs to the modules (providing a zip code for the weather and traffic or a list of stocks for the stock module), color, skin style, positioning of modules and many others as shown in the illustrative pages below, and what, if any, modules may be frozen. If a partner makes any changes to its configurations, they may automatically apply to all configured container documents for all end users associated with the partner. The manner of a partner providing configuration/customization information is detailed below. End users may then specify a second level of configuration/customization, with such end user configurations and partner configurations being applied to the partner-configured container document for that end user.

Content Freeze: One specific type of partner configuration may be a content freeze. The service provides techniques that the partner may use to disable configurability of all or only a portion of content served to end users. The content chosen for disabling is, in essence, frozen in that it cannot be further configured by a partner end user. Note that content freeze can but does not necessarily freeze dynamic content, which can be still implemented in a frozen portion of a personalized Web page, for example. (That is, freezing a portion of the page prevents further configuration of the portion but allows the portion to include dynamic content.) A column of otherwise configurable content of a personalized web page may be thus frozen, for example. When the partner is in the process of configuring the container document, however, that disabled content may not be frozen to the partner administrative user entity. This feature can be implemented by CGI parameters and authentication techniques. For example, a page request specifying that the user is a partner admin user may provide authentication values through cookies, enabling certain query parameters, so that the hosted server system provides an unfrozen page, whereas end users associated with the partner may receive a version with frozen content.

The service also allows the partner administrator to view the page as if the administrator were an unprivileged user. As noted above, the partner admin user may view the frozen content in an unfrozen context. However, if the partner is to preview the page to determine whether it is properly configured, the partner may also be able to view the page in a frozen context. The service enables correct context-dependent behavior using authentication tokens that are not only used to authenticate access to the page, but also to authenticate access to the query parameters used to enable the context dependent behavior.

Incorporation of multiple types of modules: The system enables partners and end users to designate a wide variety of modules for incorporation, including RSS modules, remote modules, API-based modules for personalized homepages, such as Google Gadget API modules and others. The ability to incorporate these modules is described in greater detail in U.S. patent application Ser. No. 11/298,930.

Multiple points of entry into the system: End users may have relationships with both the partner and the hosted server system. Accordingly, the hosted server system may enable the user to access a partner container document using authentication values associated with an account provided by the hosted server system and/or an account provided by the partner. For example, if the hosted server system is Google, a user may be able to access a partner-specific personalized home page through use of a Google login and password. Also, a user may be able to access a partner-specific personalized home page through use of a login and password associated with the partner. Either user identification may be used to receive the partner-specific container document. Also, during configuration of partner container documents, the partner admin user may select an authentication method for authenticating end users from a list of predetermined authentication methods that the system may employ. In one implementation, for example, if the system permits three authentication methods, the partner admin may choose only one of the three. Alternatively, the partner admin may allow more than one authentication method. The system then authenticates based on the method selected by the admin user. For example, the partner admin user may choose to have all partner end users authenticate via an account provided by the hosted server system. That authentication may be used even if the user also has an account with the partner. In another example, the partner admin user may chose to have all partner end users authenticate via an account provided by the partner. That authentication may be used instead of an account provided by the hosted server system. Other authentication schemes such as, e.g., anonymous authentication methods that rely only on a cookie, may be selected.

Controlled experience based on registration: Some modules may be modified based on registrations or other forms of authentication. For example, a partner that is a computer manufacturer may incorporate a help module on its partner-customized home page. The content in the help module may vary depending on registration levels of the user (e.g., whether the user signed up for ongoing customer support, what level of support they requested, etc.).

Commerce in the modules: The controlled experience may enable the partner to monetize the partner container document. A user may be charged a subscription fee by the partner to access certain modules or content within the modules. For example, the partner may offer a music module. A subscription to the partner's music module may enable the user to choose certain selections of music to hear based on subscriptions. Also, within the music module, the partner may offer different subscriptions. For example, one subscription may permit an end user to listen to music, while another may permit the user to listen to and download music.

Search box module: One of the modules that a partner may select may be a search module that leads to a hosted search page that serves advertisements (e.g., linked to an existing AdSense for Search). The display of advertisements in association with the search module provides another way for the partner to monetize the partner container document. In one example, the search box module may be a required module of a container document.

Selective and automatic internationalization: The container document may internationalize the container document based on configurations/customizations provided by the partner or its users.

Data-driven container documents: The container document for a partner may be designed to generate a common template with different content based on data input to the system (e.g., WiFi detection is used to have the partner container document modified depending on location). The system may also provide different localized partner container documents.

Modification of a default container document: The system may provide a default container document that the partner then configures. The container document server and/or hosted server system then cooperates with an interface provided to ensure that the content provided meets the partner configuration selections in a safe manner.

Fully-functional preview: A partner admin user interacting with the configuration interface may view a live version of the container document based on configuration information being input and what the user sees is the container document that includes the actual content and modules from the hosted server system (e.g., not just a mock-up). The system may further allow editing of a module from within the preview page.

Live updates to container documents and live preview: Use of a central repository of events with associated interested parties enables the system to update live previews and live container documents based on changes related to those items. The repository may track what user interfaces or modules are to be notified of events that alter their performance and then may notify them immediately. As an example, if a partner admin user is requesting a change to the background color of the partner customized container document, as soon as that partner admin user selects a color swatch, the background automatically changes (rather than requiring the user to say "Apply" for example) for a real, live preview.

Each of these features will be understood in greater detail in the context of the following systems, methods and example pages discussed below.

Multiple Levels of Configurability and Content Freezing

One implementation feature for this service and system relates to multiple levels of configurability of the content of a container document. An example container document is next described along with an example system that may be used to enable a partner and end users to provide configuration information.

One example of a container document is a personalized portal page that is associated with a user of a partner or other user group. A portion of the content on the personalized portal page may be predefined by the partner/user group, and a portion of the personalized portal page may be configured and customized by the end user.

The container document "contains" one or more modules. Any number of the modules or other content "contained" within a container document may be predefined by a representative of a user group. As used herein, the term "container document" or "container" should be understood to include a personalized homepage of a website, a portal page associated with a user group, a sidebar, toolbar element that incorporates one or more such modules, a page hosted by a site, a document capable of rendering modules (e.g., any document capable of rendering HTML code or XML code) in the format of the module (e.g., XML). Also, the container document may be a website of another entity that incorporates modules provided to the website from a syndication system.

As used herein, the term "module" may be understood to refer to a piece of software and/or hardware that renders data for use in a container document. Modules may be personalized to user preferences, preferences of the container, preferences of the environment or other inputs, including preferences defined by the user group, for example. A module specification may be understood to include a set of instructions used to render data for the container document using elements that have been predefined.

Figure 2:
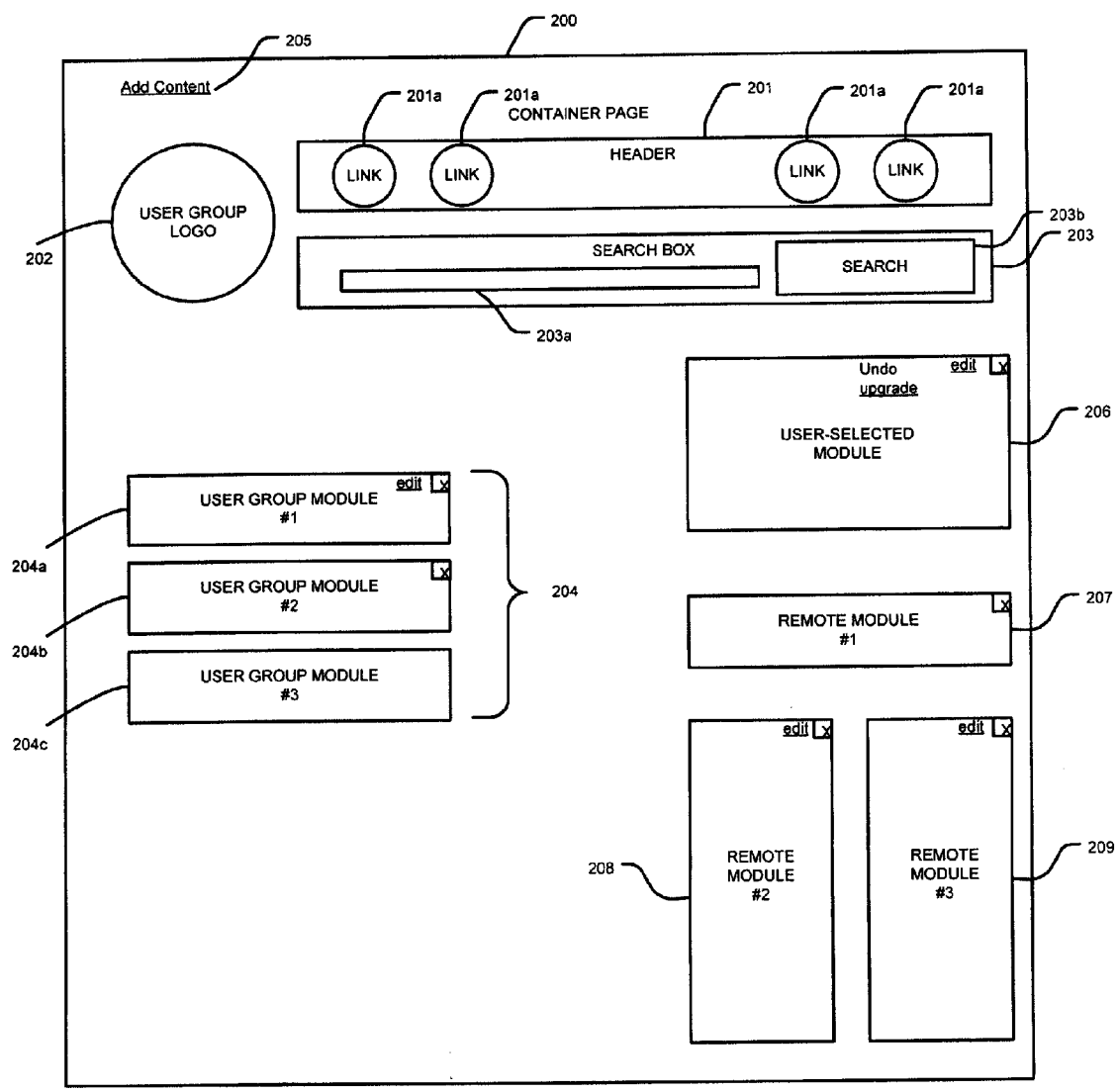
FIG. 2 depicts an illustrative container document according to various embodiments of the present invention.

It should be appreciated that various forms of the container document may exist but one such illustrative example is depicted in FIG. 2. FIG. 2 depicts a container page 200 with a plurality of modules that have been incorporated into the container document using IFRAME and inline HTML techniques. These IFRAMES may allow the hosted server system to encapsulate the arbitrarily selected content defined by the user group. In one example, modules may also be served in the container document with or without an encapsulation layer. Encapsulation layers may provide useful functions in many types of systems, (e.g., serving a module within an IFRAME in an HTML document provides a security enhancing barrier). Other applications may prefer to serve module content without such an encapsulating layer (e.g., for improved performance or ease of layout or content management).

FIG. 2 depicts a plurality of modules and other content within container document 200 including a header 201, a logo 202, a search box 203, user group content 204, an "add content" element 205, a user-selected module 206, a remote module 207, a remote module 208, and a remote module 209. Different formats for the various modules may exist depending upon, for example, the specification of the creator of the module and/or the definition of the module by a representative of the user group. As depicted, some modules may provide scroll bars, and others may not. Some modules may have different sizes or shapes compared to other modules. In addition, some modules may offer the opportunity for the user to edit the display preferences and/or per-use data associated with the module. (See, for example, modules 206, 208, and 209 that provide an edit link.) For example, if the module relates to a weather module, the user may be provided the opportunity to edit the city or zip code for which the weather is displayed in that module.

A portion of the content on the container page 200 may be created and/or predefined by a user group and/or a representative of a user group. For example, the header 201 may contain links 201a that are associated with the user group. Logo 202 may also be a logo that is associated with the user group. User group content 204 may be created and/or defined by the user group and optionally locked or frozen (described below) so that users of the personalized container document cannot remove, edit or add user group content.

Header 201 may comprise HTML and/or XML code to create, for example, a banner on container page 200. Header 201 may include links 201a that may be associated with the user group. For example, where a user group is associated with computer hardware provider, links 201a may include links to particular services provided by the computer hardware provider (e.g., service and support) and links to particular goods provided by the computer hardware provider (e.g., desktops, laptops, peripherals, and/or printers). Where a user group is associated with an Internet Service Provider (ISP), links 201a may include links to email, content driven pages provided by the ISP (e.g., sports, finance, shopping, etc.), customer service, and the like.

Search box 203 may include a text field 203a and a search button 203b, where a user can enter text into text field 203a, and activate (e.g., click on) search button 203b which initiates a search engine that may be associated with container page 200 to search for the text entered into text field 203a. When search results are returned, a search engine associated with the container document may track any follow-on action performed by the user as will be described in greater detail below.

Container page 200 may contain user group content 204. User group content 204 may include user group modules 204a-204c. User group content and user group modules 204a-204c may be created and/or defined by the user group. Modules 204a-204c may be modules that are specifically associated with the user group and/or any other unrelated module that may be selected for inclusion into user group content 204. A representative associated with the user group may be granted administrative privileges to create and/or define user group content 204.

One of the functions provided with this example container document 200 is the opportunity for the user to add content to the container page through selecting the "add content" element 205. The content that may be available to be added to container page 200 (e.g., the taxonomy) may be defined and/or restricted by the user group. For example, a user group may restrict a user from adding modules of a competitor or any other modules that may be deemed to be undesirable by the user group.

Upon selecting the "add content" element, the system may offer an end user the opportunity to interactively indicate an additional module to be included in the container page based on the taxonomy defined by the user group, for example. Various forms of an interface to receive that input may be provided.

User-selected module 206, and remote modules 207-209 may be a result of adding content.

Content Freezing

The content added by the user may be placed within container page 200 in accordance with the preferences of the user. However, the user may be restricted or prevented from placing, moving, or modifying some content defined by the user group. In other words, certain portions of the partner/user group defined container document may be frozen to the user. Thus, the resulting container page 200 may include a portion of the container page that is defined by the user group in accordance with preferences established by the user group and a portion of the container page that is defined by the user in accordance with preferences of the user. For example, a column of modules or row of modules may be frozen so that the user may not eliminate, move, alter or change their position and/or content. In addition, certain blank spaces on a partner container page may be frozen to prevent a user from adding a module to that blank space.

Interaction with Container Server System

As described above, the hosted server system 10 may serve a container document to end users of the partner based on partner-specified configurations and end-user specified configurations. To actually generate a container document with content, a variety of platforms may be used.

Figure 1C:
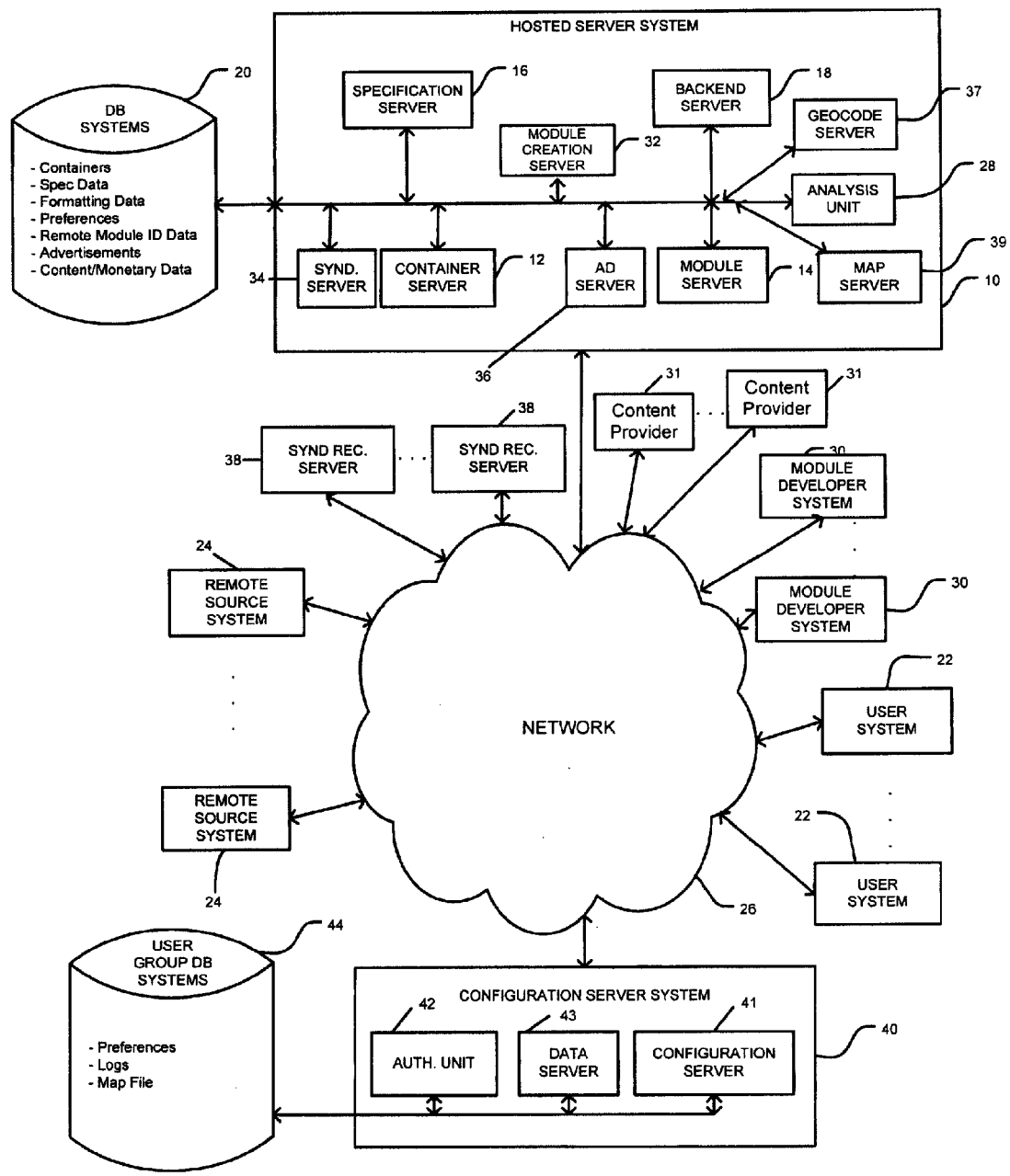
FIG. 1(c) depicts an overall system architecture according to various embodiments of the present invention.

One such platform may be the Remote Module system and the associated Personalized Google Homepage system, which is described in detail in co-pending U.S. patent application Ser. No. 11/298,930, filed on Dec. 12, 2005, entitled "Remote Module Incorporation Into A Container Document," (hereinafter "the '930 application") the contents of which is hereby incorporated by reference. (Note that in the event of an inconsistency between the present disclosure and the '930 application, the present disclosure controls with regard to each embodiment separately. In the event that the present disclosure and the '930 application are consistent, but of differing scope, the disclosure of greater breadth controls with regard to each embodiment separately.) That application details an example hosted server system 10. FIG. 1(c) depicts an overall system diagram that provides a number of systems operating with hosted server system 10. Details of an example host system taken from the '930 application are provided later in this document.

To facilitate a partner being able to take advantage of the service, the partner/user group may enable one or more partner admin users to interact with a configuration server system that communicates with or is part of hosted server system 10. An example of such a system is shown as element 40 in FIG. 1(c). Configuration server system 40 may have a configuration server 41, authorization/authentication unit 42, and a data server 43. In addition, one or more user group database systems 44 may operate in conjunction with the various units of configuration server system 40. Configuration server system 40 may connect over network 26 (e.g., the Internet) to hosted server system 10. In one example, configuration server 40 may be hosted.

With regard to configuration server system 40, a configuration server 41 may be provided to allow representatives of a user group to create and/or define a container document, or a part of a container document (e.g., a set of modules) to be associated with the user group and to enable a partner end user to select/identify an authentication method or methods to be applied for container documents. Configuration server 41 may also communicate with hosted server system 10 to serve a container document to users of the user group.

An authorization/authentication unit 42 may be provided to authenticate the representative of the user group that may be charged with creating and/or defining the container document associated with the user group.

A data server 43 may be provided to serve the data that may be displayed on a container document. Data server 43 may store and serve images and/or any other data that may be used in a container document, for example. Data server 43 may also store HTML code for modules that may be designed specifically for users of the user group, for example.

While one configuration is shown in FIG. 1(c), it should be appreciated by one of ordinary skill in the art that other configurations of these various units may also be possible. For example, the various units depicted within hosted server system 10 may be disposed at various locations around network 26 or at various points on several networks. Similarly, the various units depicted within configuration server system 40 may also be disposed around various locations around network 26, including within, for example, hosted server system 10. In addition, whereas a single hosted server system 10 and a single configuration server system 40 are depicted, it should be appreciated that any number of each of the units depicted on FIG. 1 may be provided including network 26.

Illustrative Configuration Server

Figure 3:
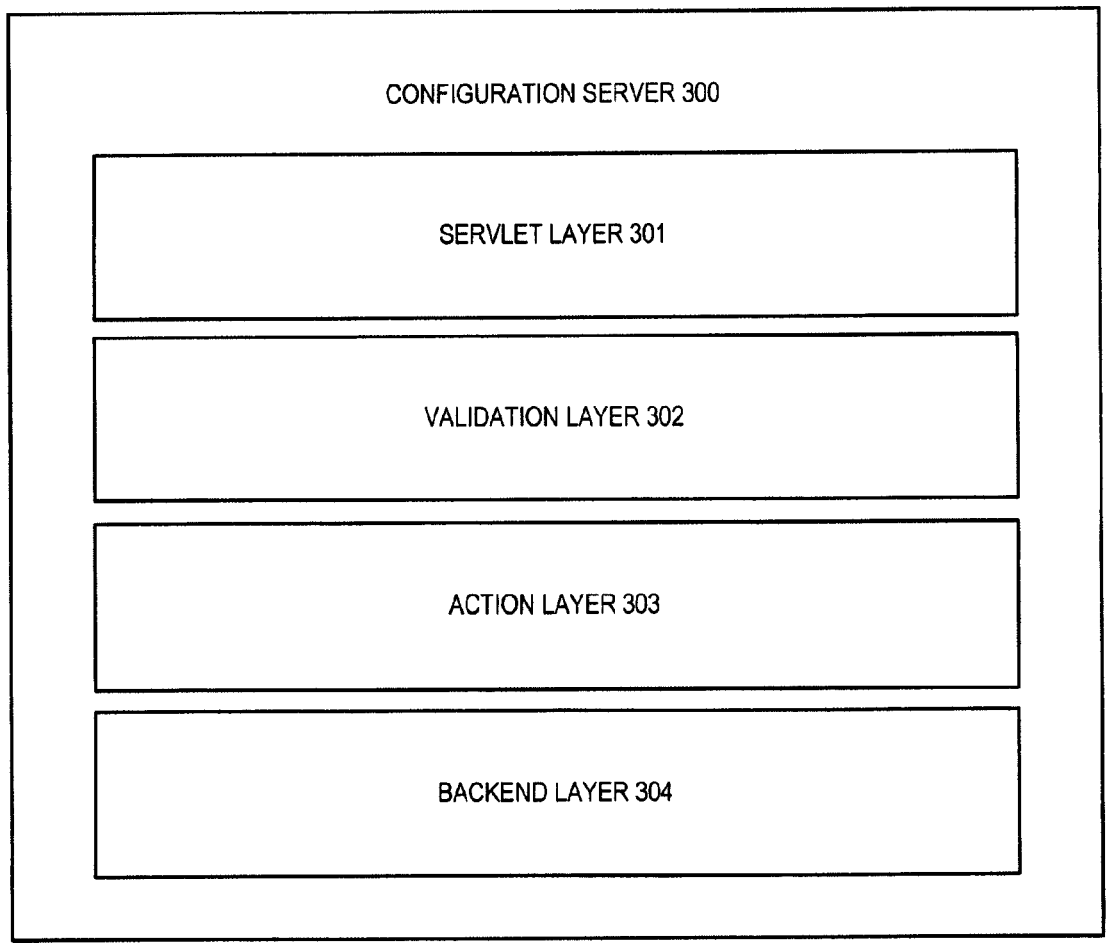
FIG. 3 depicts an illustrative configuration server according to various embodiments of the present invention.

FIG. 3 depicts an exemplary embodiment of a configuration server 300. Configuration server 300 may be a tool for representatives of the user groups to create and/or define one or more container documents for users of the user group and establish an authentication method for users of the user group. As shown in FIG. 3, configuration server 300 may include a servlet layer 301, a validation layer 302, an action layer 303, and a backend layer 304.

Configuration server 300 may serve a web application to user systems of representatives of the user group (e.g., partner admin user 17) to enable those representatives to create and/or define one or more personalized container documents for users of the user group. Configuration server 300 may also be a local application run by a user. For security reasons, or to restrict the number of users that have access to the application, a partner may provide the local, standalone application to the representatives for installation on their user systems, for example. The representatives may be identified as having administrative privileges for the user group. These privileges may enable the representative to receive the web application (or install the local application) to create and/or define one or more personalized container documents for users of the user group. The web application received (or local application installed) by the representative may include a HTML editor to enable the representative to edit a container document, for example.

Configuration server 300 allows representatives and/or privileged users to define, for example, an optional banner and/or header across the top of a container document, optionally lock one or more column of modules contained within the container document, configure a default set of modules to appear on a container document, configure a set of available modules that may be included on a user's personalized container document (e.g., the taxonomy), configure default options for the modules that appear on a user's personalized container document, and/or define and/or configure the container document in any other manner possible. Configuration server 300 also allows representatives and/or privileged users to select a uniquely-indexed partner domain that may be used to dynamically provide the container document to users and select an authentication scheme for authenticating the users.

Servlet layer 301 may execute three exemplary servlets in cooperation with the application executing on a representative's user system, for example. In such an embodiment, as will be understood, a servlet may include any program, such as a Web server, a servlet engine, a CGI script, or a non-Web-based remote configuration program. For example, a first servlet may be executed to serve a user interface to an authorized user of the configuration server. The first servlet may accept no-parameter HTTP GET requests and may serve an initial HTML interface and a JavaScript client to an authorized user, such as a representative of the user group, for example. Also, the first servlet may retrieve data from a backend interface (e.g., a list of pages available for update by the authorized user) and present such data to the user.

A second servlet may be executed to receive updates to one of the container documents, for example. Inputs and outputs may be received and transmitted, respectively, by this servlet in JavaScript Object Notation (JSON) format. An input parameter may be associated with an "action" and the value may be a JSON representation of a batch of "action" objects. This servlet may deserialize (e.g., convert the "action" object into a JAVA file) the JSON representation and pass the deserialized parameter to other layers within the configuration server. Also, this servlet may generally convert configuration information from its user input format (e.g., JSON) into HTML, XML, Microsoft Word macros, or the like.

A third servlet may be executed to handle data uploads, for example. Data including, but not limited to, images may be received as "multipart/form-data," and may need to be extracted in a manner different than extracting GET/POST parameters. Once extracted, the request to upload the data may be passed to other layers within the configuration server.

The servlets described above may be accessible only by those representatives of a user group that are authorized. To receive the web application, a user may initially issue a request to the first servlet, be authorized by an authentication/authorization unit, be served a user interface, and then indirectly issue other requests to other servlets through the user interface. Also, to receive the local standalone application, the partner/user group may provide the application on disk or make it available for download by the user. The user may then install the application and run the application to indirectly issue other requests to other servlets through the user interface.

Validation layer 302 may verify the data that is received by the servlets and convert the data for use by other layers of the configuration server. For example, servlet layer 301 may accept external requests, and because this data is external, it may need to be verified as being secure. Further, servlet layer 301 may receive parameters as strings. When parameters are received as strings, those parameters may need to be converted into, for example, typed parameters.

Validation layer 302 may accept "action" objects from the servlet layer 301. The "action" objects may provide the requested "action" and a string-string name-value map of parameters required to execute the "action." Given the "action," validation layer 302 may determine from another layer within the configuration server, what types of parameters are required to execute the "action." Based on this determination, validation layer 302 may validate the input strings and convert the input strings to the appropriate type of parameters.

The types of parameters may be represented as "action parameter types." By representing the types of parameters as "action parameter types," standard Java-types may be superseded. For example, a uniform resource locator (URL) and a block of HTML may be represented in Java as strings. Different validation rules may be applied to these different parameters (e.g., a URL may be well-formed with a recognized scheme and only contain valid characters, while HTML may be scrubbed such that it may not contain JavaScript, that may open security holes). To apply different validation rules to different types of parameters, validation layer 302 may run different "action parameter types" through different validators.

Figure 4:
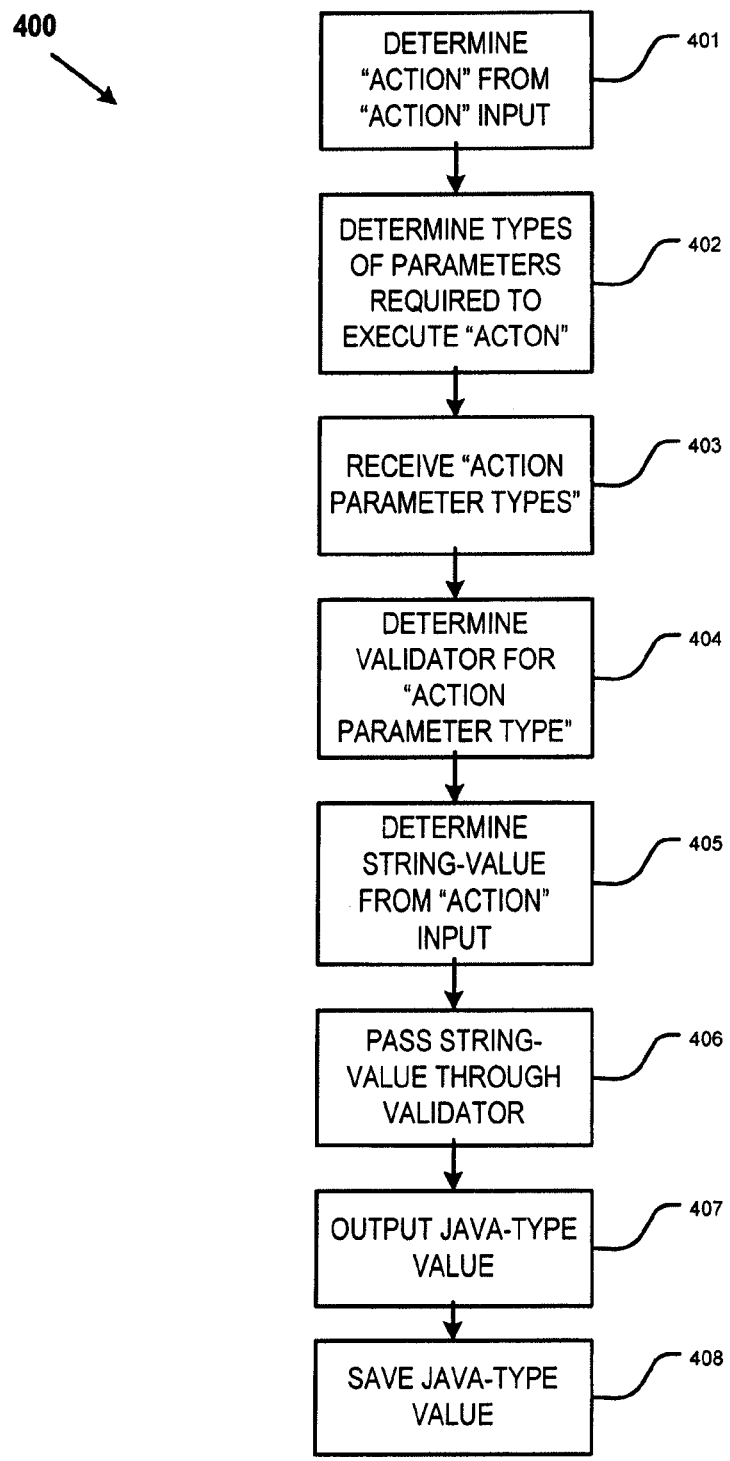
FIG. 4 depicts an illustrative process for determining a validator according to various embodiments of the present invention.

Mapping each "action" to a list of "action parameter types," may also allow validation layer 302 to automatically select which validator is required for each "action." FIG. 4 depicts an exemplary embodiment of a flow chart 400 for automatically selecting which validator may address a specific "action." In block 401, the "action" may be determined from the "action" input. In block 402, the types of parameters that are required to execute the "action" may be determined. This determination may be accomplished by another layer within the configuration server.

For each parameter type required to execute the "action," in block 403, the "action parameter types" may be received. In block 404, the validator for the "action parameter type" may be determined. In block 405, the string-value of the parameter from the "action" input may be determined. In block 406, the string-value may be passed through the validator. In block 407, the validator may output a valid Java-type value for the corresponding string-value. In block 408, the Java-type value may be saved.

One or more methods for validation may be used. For example, simple parameters (e.g., Boolean expressions) may be parsed using a Boolean filter, while complex parameters (e.g., objects) may be deserialized into a Java object. Validation layer 302 may pass validated parameters to action layer 303 for action.

Action layer 303 may execute an "action." Action layer 303 may receive requests from validation layer 302 and interact with backend layer 304 to execute the "action."

"Actions" may be registered with an "action manager" so that the "actions" may be executed. In such an embodiment, to register an "action" with the "action manager," an "action info" object indicating, for example, the java-class and public method containing the logic and the parameters required to execute the "action," may be specified. When an "action" is registered, the "action manager" may be queried for the parameters required to execute the "action," and action layer 303 can then request execution of the "action" and pass those parameters.

As noted above, action layer 303 may interface with backend layer 304 to execute an "action." In such an embodiment, when interfacing with backend layer 304, action layer 303 may cache data received from backend layer 304. Similarly, action layer may store multiple updates, for example, before passing the updates to backend layer 304.

Backend layer 304 may provide an interface with backend units in the system. Backend units in the system may store and provide access to data associated with the user groups and container documents for the user groups. Such data may include, for example, preferences of the user group (e.g., default preferences for a container document), data to map user groups to the respective preferences of the user group, login authentication and authorization data (including data about authorized representatives of the user groups), images, content for a portion of a page that may be defined and/or personalized by a user group, and/or any other data related to user groups, representatives of the user groups, or users of the user groups.

Illustrative Process for Configuring a Container Document

Container documents (e.g., portal pages or personalized portal pages) may be initially configured by a representative of a user group. Also, container documents may initially be configured as a result of group voting or meta-group requirements (e.g., groups within a group). The content may also be initially determined as a result of collaborative filtering. As described above, personalized container documents may include a portion of content that may be created and/or designed and/or configured for the user group and a portion of content that may be configured by users of the user group. The configurations by the users of the user group may be limited by the configuration and/or design presented by the user group.

Figure 5:
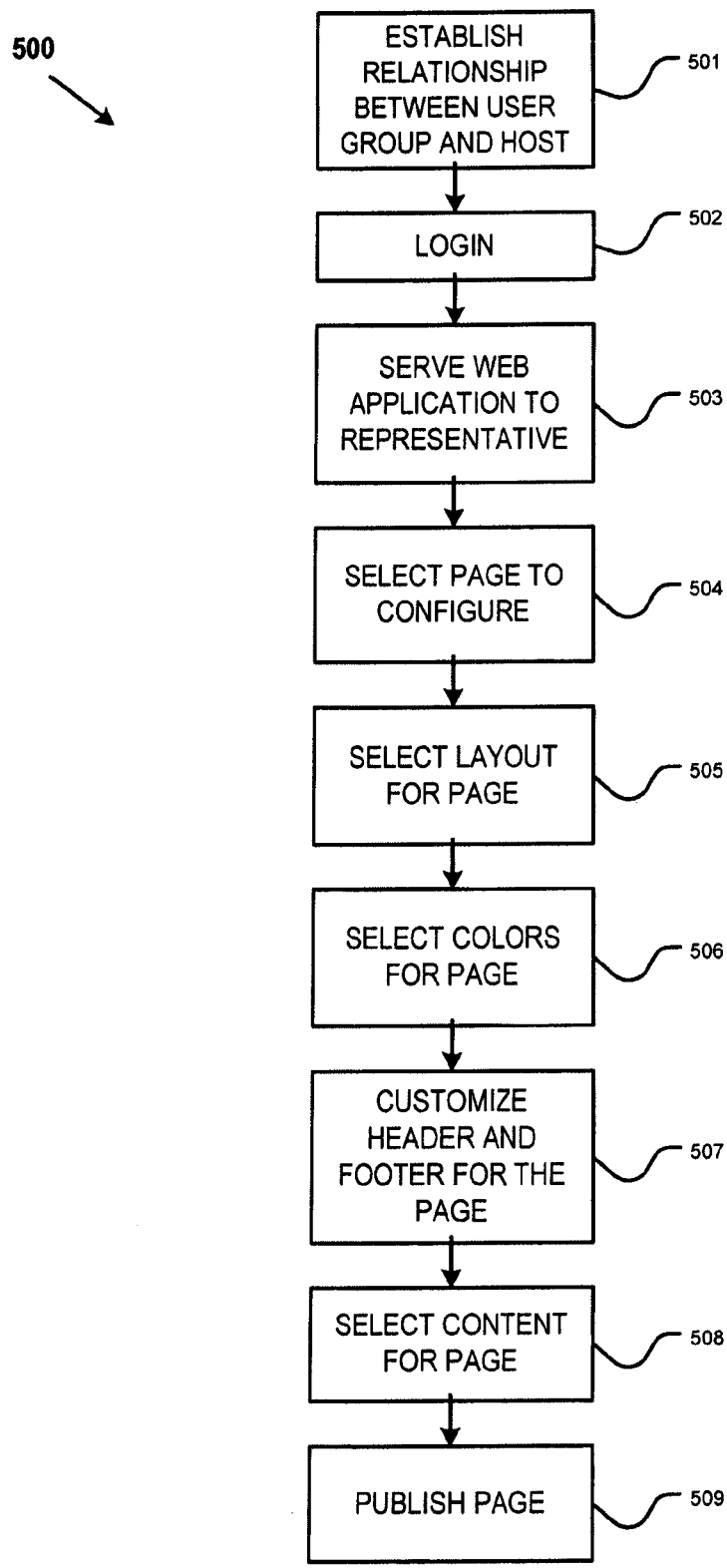
FIG. 5 depicts an illustrative process for configuring a personalized container document according to various embodiments of the present invention.

FIG. 5 depicts an exemplary flow chart 500 which illustrates an exemplary method for designing and configuring a container document. In block 501, a relationship with a user group may be established. A user group may establish a relationship with a host of the container document, for example. To establish a relationship with a host, a user group may identify itself and one or more representatives that may be authorized to design and/or configure a container document on behalf of the user group. In one example, the user group may also establish an account with the host. The account may be a Google AdSense account or any other account that may be used to store any data about the user group.

Where the user group has a preexisting account with the host, the user group may indicate as such and the system may associate the user group with the preexisting account. When the user group has been identified, an identifier associated with the user group may be stored in a database system associated with the configuration server. The domain name may also be included in a map file, for example, that may map the user group to data associated with the container documents for the user group.

In one example, the domain name may be selected by the user group. For example, the user group may select a domain name such as, e.g., "start.usergroup.net." This user group-selected domain name may then be mapped to, for example, a more explicit path such as "partnerpage.host.com/usergroup.net" and this masking/aliasing information may be stored by the host server system in a dynamic table of uniquely-indexed partner domains.

To begin the configuration process, in block 502, a representative of the user group may login to a configuration server system. For example, a representative may include a corporate representative of the user group, a web master of the user group, a agent of the user group selected by the user group, or any other person or group of people selected to represent the user group for purposes of configuring a container document. An authorization/authentication unit may receive a login request including, for example, a user name and password associated with the representative, determine whether the representative has administrative privileges for the user group, and grant access to the configuration server system based on a determination that the representative has administrative privileges for the user group.

In block 503, the configuration server system may serve a web application to the representative. A representative may be operating a client device and/or user system capable of providing inputs to the web application (or standalone application) to configure a container document or personalized container document. A servlet associated with a configuration server may serve the web application to the client device and/or user system. The client device may receive the web application and execute the web application on the client device. Where the application is a standalone application, the standalone application may be installed and executed on the client device. The web application (or standalone application) may include, for example, an editor for editing the header and/or other portions of the container document and other tools for configuring and/or designing a personalized container document. Such other tools may include, for example, an action bar, for receiving actions to be executed; a tab set, including a layout tab, a colors tab, a color code editor, and other modules; an available content tab to create custom modules and/or define the module taxonomy; a live preview pane; a module picker; a header and footer tab; and a URL editor tab.

Figure 6:
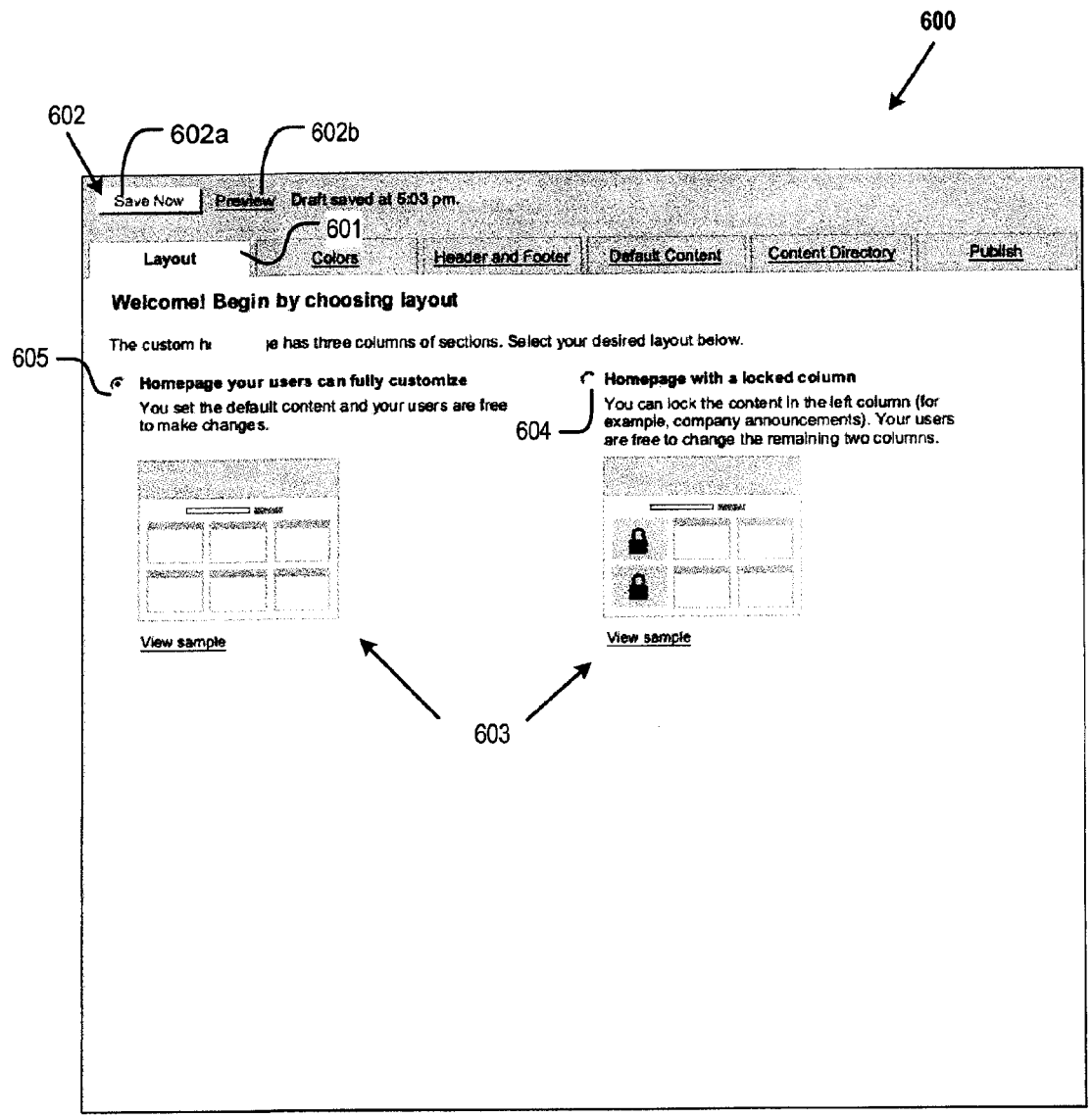
FIG. 6 depicts an illustrative application interface according to various embodiments of the present invention.

The action bar may include, for example, icons or buttons, that when activated, may trigger the execution of an action. Such actions may include save, delete, edit, open file, open blank container document, change format of the container document, display live preview, insert object or module, and any other like action. The layout tab may include a selection of predefined layouts that, for example, enable the user to freeze (or lock) a certain portion of the container document or permit a user to control all content on the container document. FIG. 6 depicts an example application interface 600 including a layout tab 601 in accordance with an exemplary embodiment. As shown in FIG. 6, application 600 may also include an action bar 602 having a "Save Now" button 602a and a "Preview" element 602b. As shown in FIG. 6, application 600 may also include a locking portion that allows the representative to select whether to freeze (or lock) a portion of the container document. To select the freeze (or lock) option, the representative may activate the radio button 604 associated with freezing (or locking) the content. To allow users to fully customize the container document, the representative may select radio button 605 associated with unlocking the content.

Upon receiving the application, the representative may select which container document to be configured in block 504. If the user group has not previously configured a container document, the representative may initialize a container document to be configured. If the user group has configured one or more instances of container documents, the representative may be presented with an interface that enables the representative to select from among the container documents to configure.

In block 506, a layout may be selected. The representative may select whether to optionally freeze (or lock) one or more columns on the container document or allow the user to control all of the content on the page. For example, FIG. 6 shows a layout tab 601 for enabling a representative to select a layout for the container document.

Figure 7:
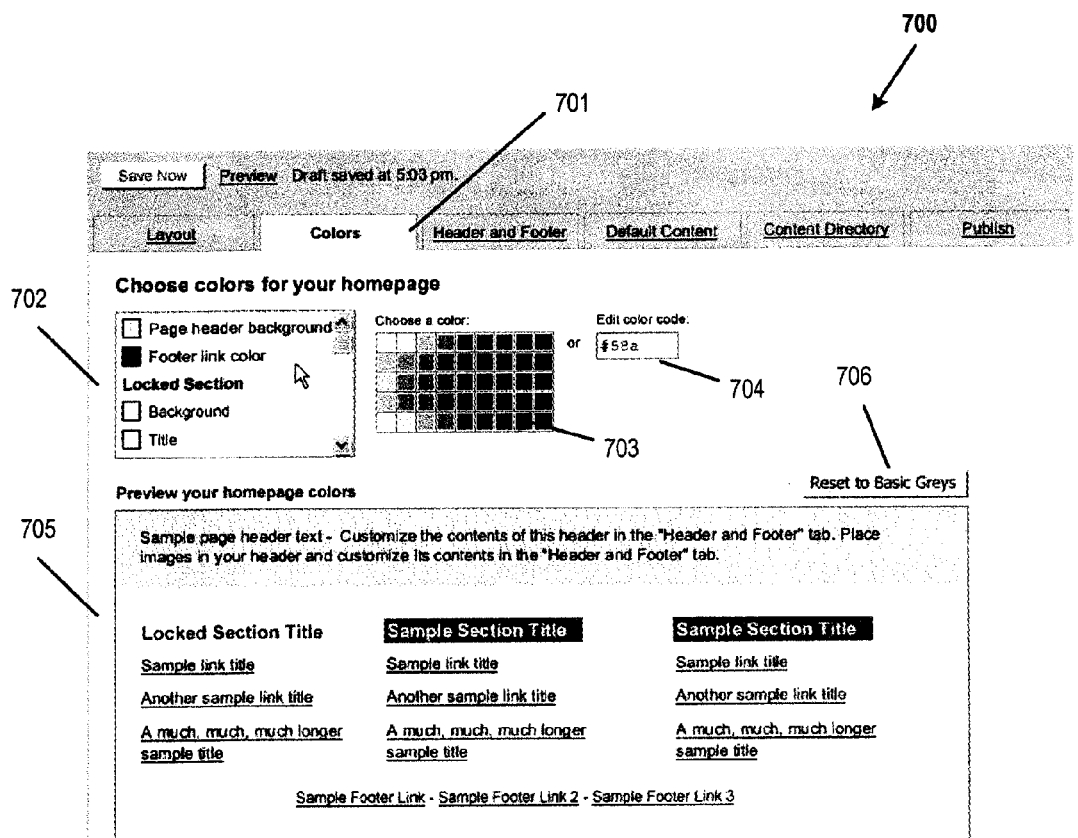
FIG. 7 depicts an illustrative application interface according to various embodiments of the present invention.
Figure 8:
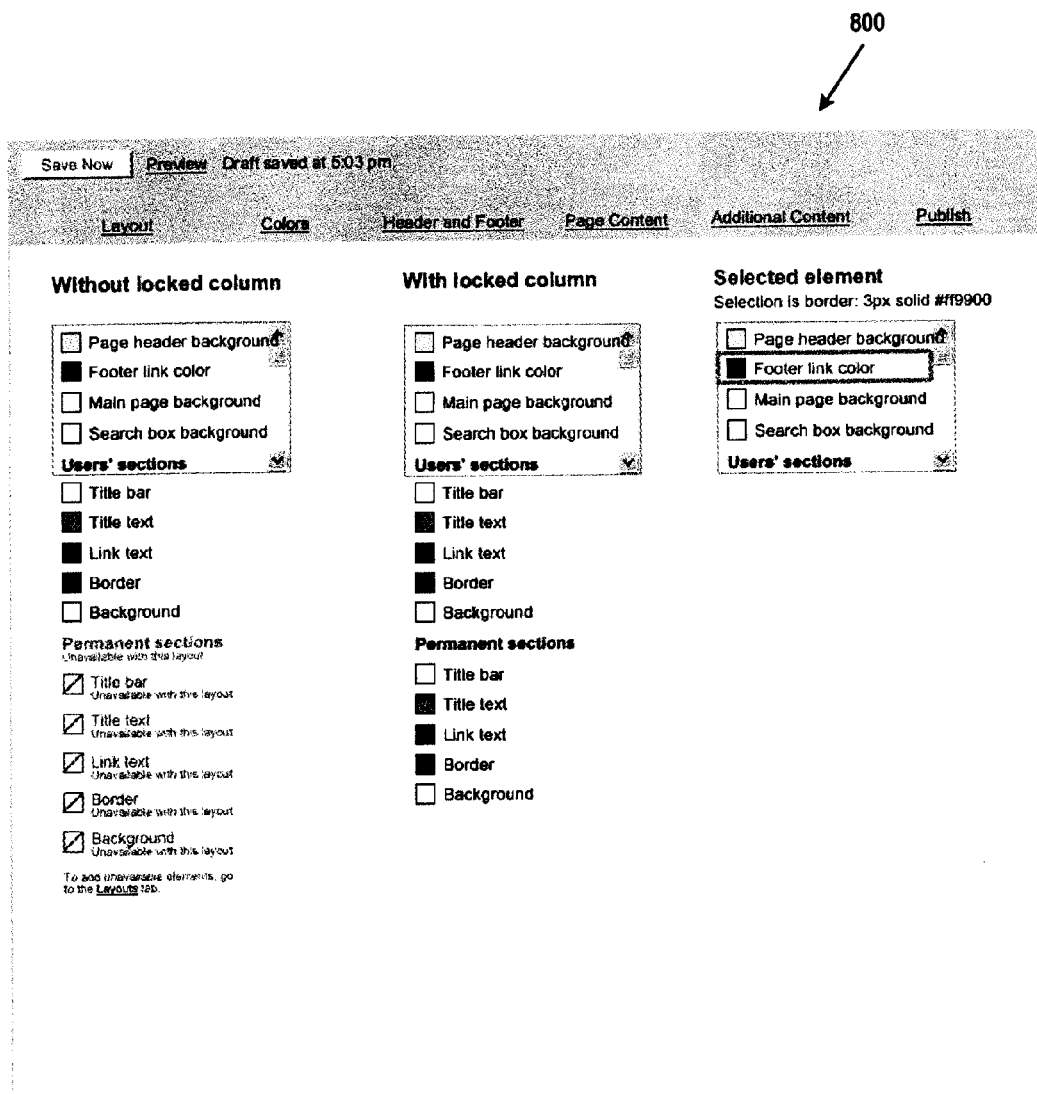
FIG. 8 depicts an illustrative application interface according to various embodiments of the present invention.

In block 506, colors for the container document may be selected. FIG. 7 depicts an exemplary embodiment of an application interface 700 including a colors tab 701 to enable a representative, for example, to select colors for various sections of a container document. As shown in FIG. 7, colors tab 701 may include an element selection portion 702, a color palette 703, a text box 704, a preview pane 705, and a reset button 706. Element selection portion 702 may enable a representative to select the portion of the container document that is being changed. For example, as depicted, a user may select to change the container document's header, background, title, etc. Color palette 703 may enable a user to select a color from those colors presented on the palette for the selected portion of the container document. Text box 704 may enable a representative to directly enter a known color code into text box 704 to select a color for the selected portion of the container document. Preview pane 705 may display a mock-up of the colors selected for the container document. FIG. 8 depicts another embodiment of an application interface 800 to illustrate the colors selected for a container document. Reset button 706 may allow the representative to return all colors to grey, for example. As shown in FIG. 8, each portion of the container document is identified and a color square indicating the selected color for that portion may be placed adjacent to the identified portion. For example, as shown in FIG. 8, the "Title Bar" with a frozen (or locked) column includes a white color square adjacent to the "Title Bar" text.

Figure 9:
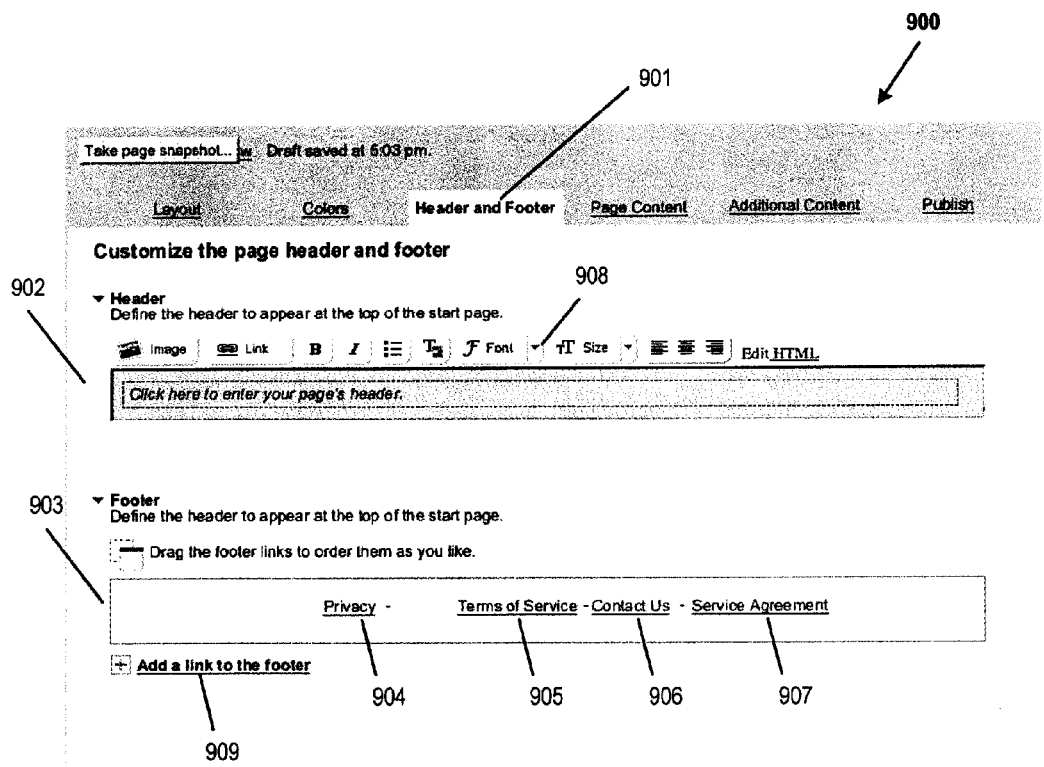
FIG. 9 depicts an illustrative application interface according to various embodiments of the present invention.
Figure 10:
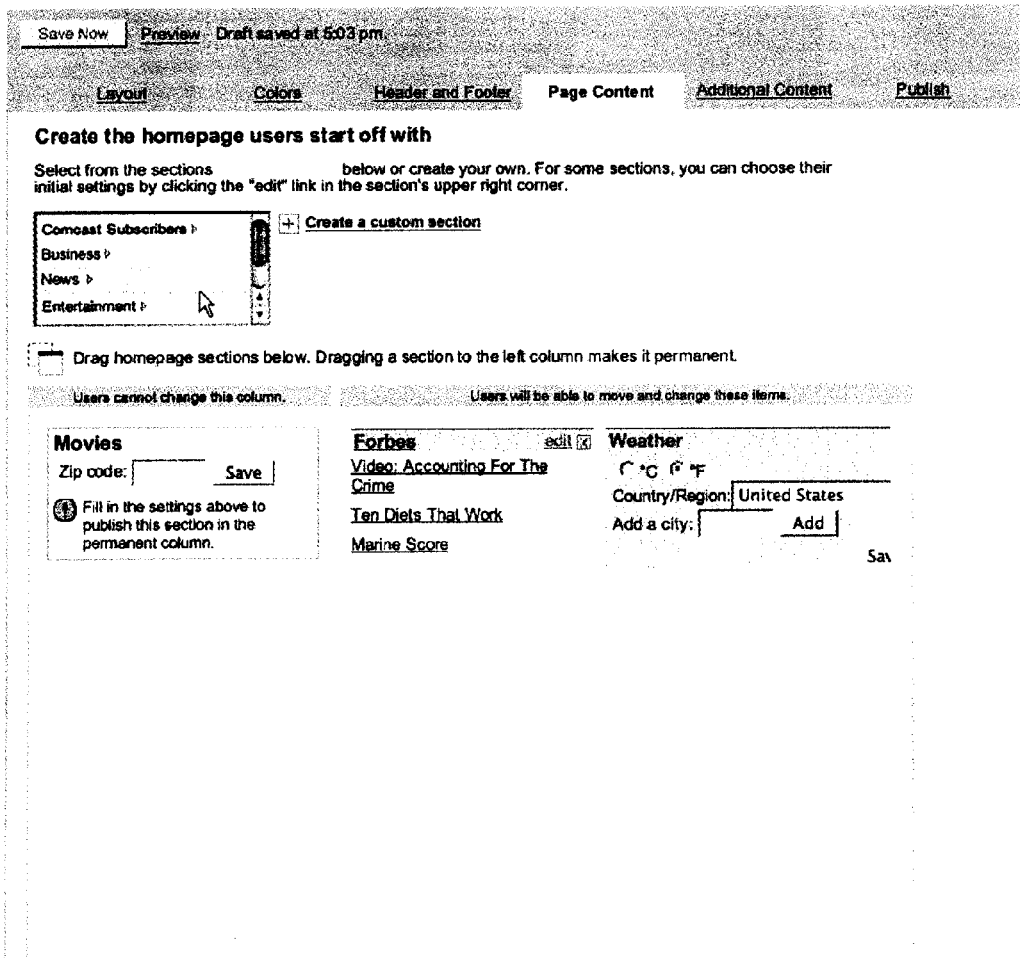
FIG. 10 depicts an illustrative application interface according to various embodiments of the present invention.
Figure 11:
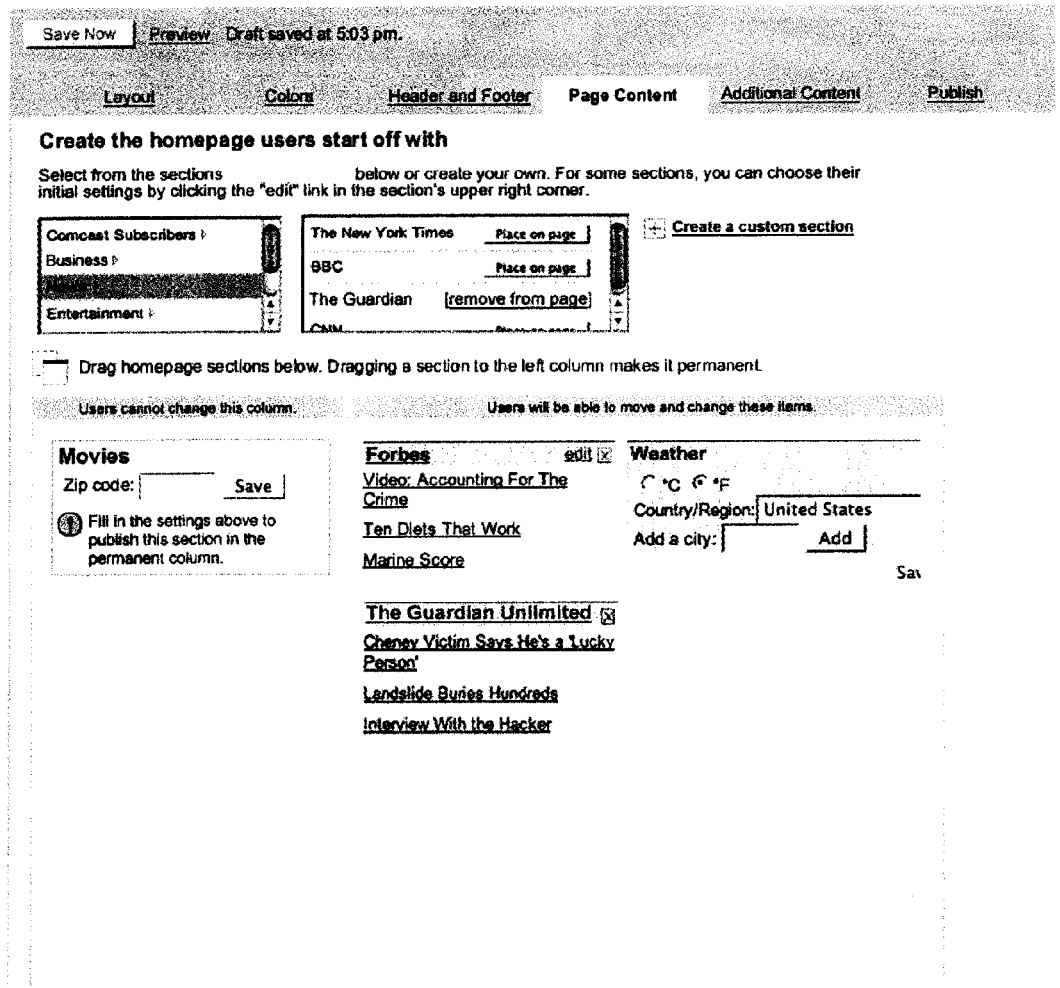
FIG. 11 depicts an illustrative application interface according to various embodiments of the present invention.
Figure 12:
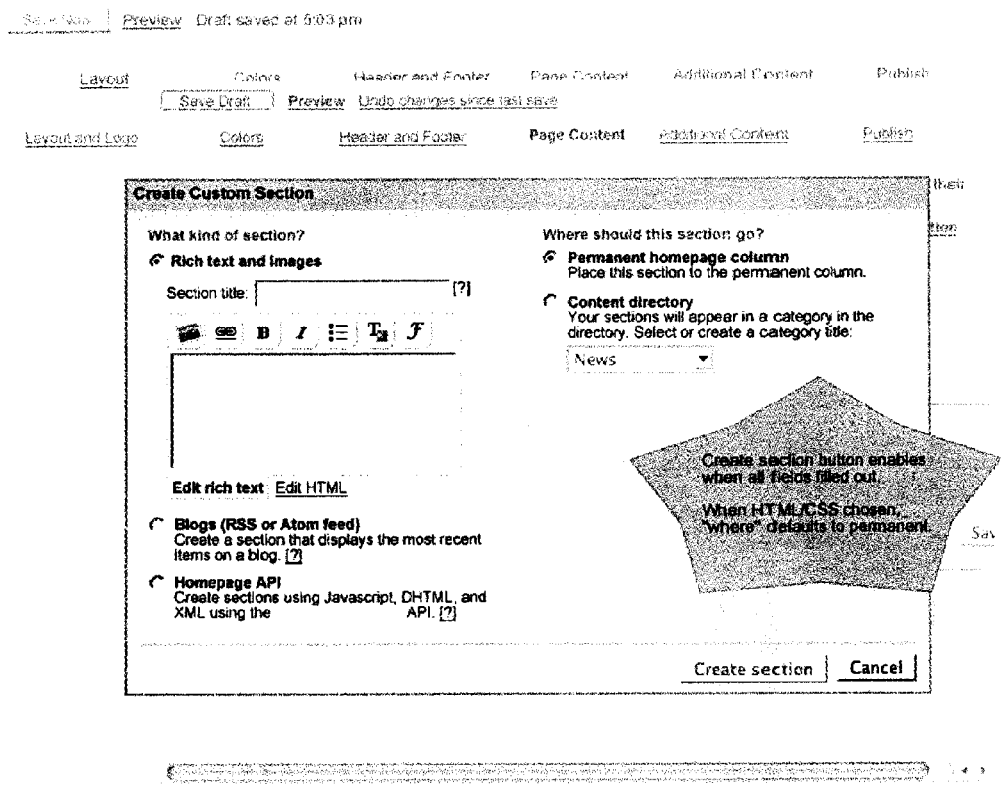
FIG. 12 depicts an illustrative application interface according to various embodiments of the present invention.
Figure 14:
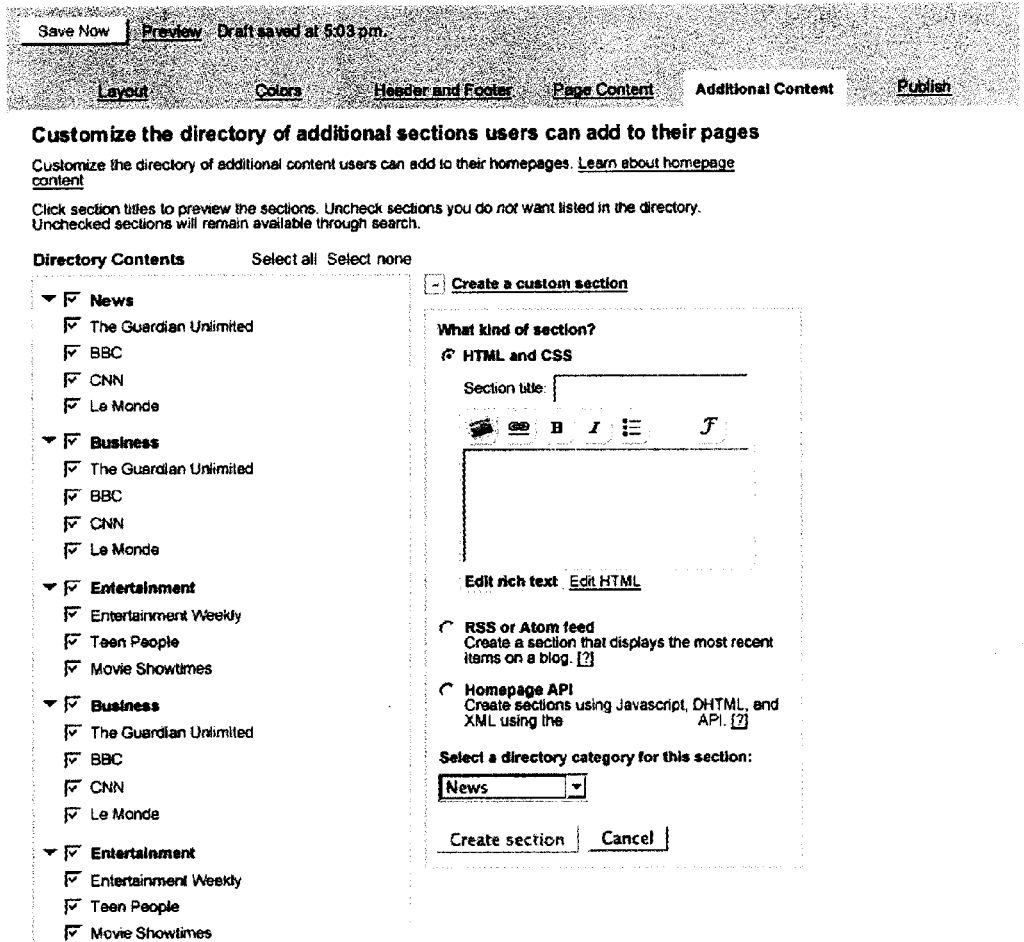
FIG. 14 depicts an illustrative application interface according to various embodiments of the present invention.
Figure 17:
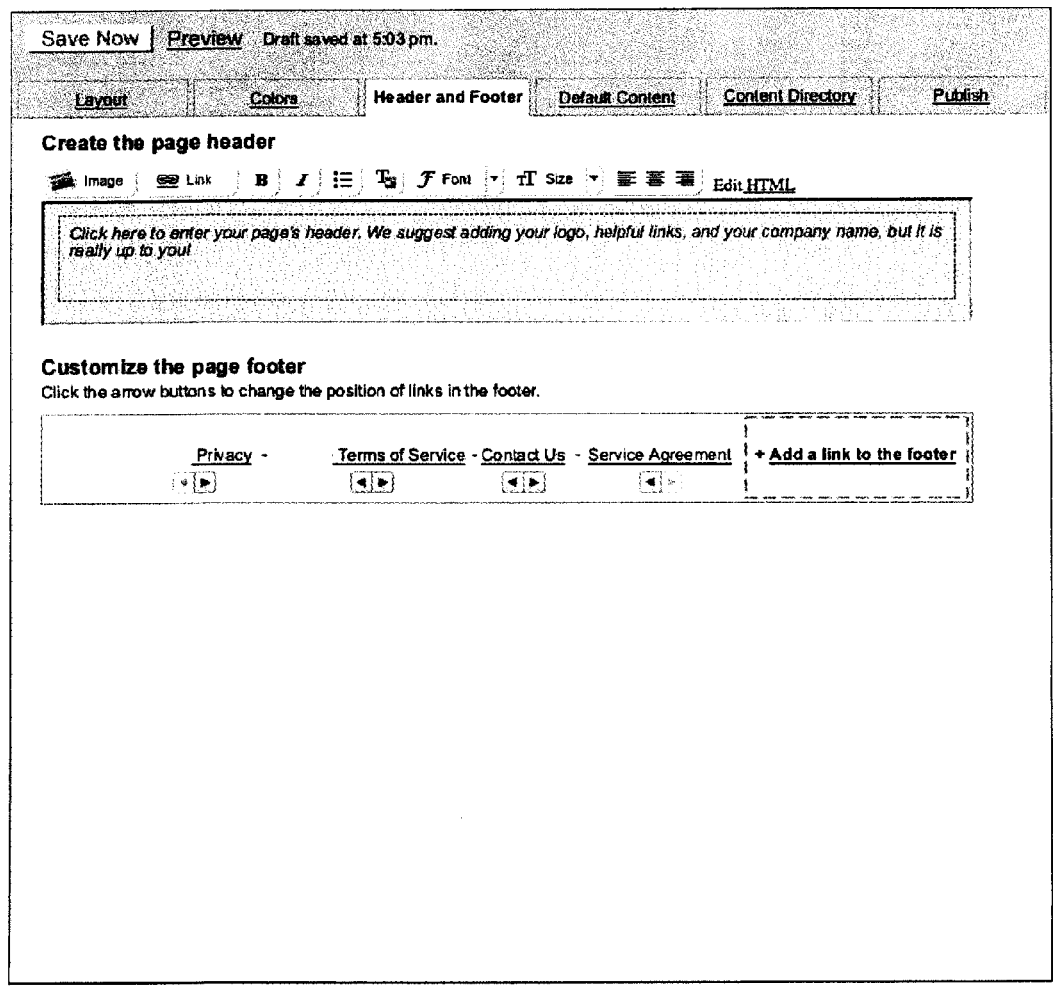
FIG. 17 depicts an illustrative application interface according to various embodiments of the present invention.
Figure 18:
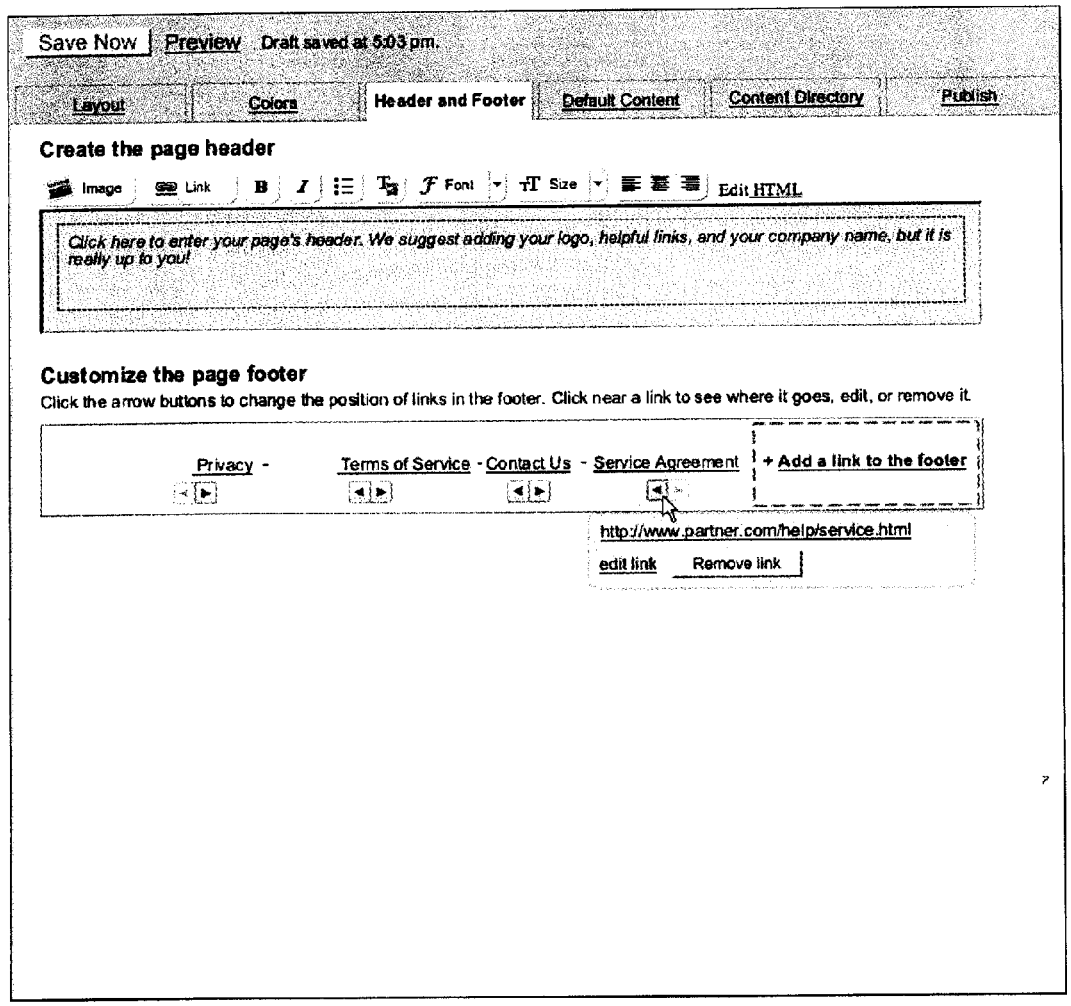
FIG. 18 depicts an illustrative application interface according to various embodiments of the present invention.

In block 507, a header and footer for the container document may be customized. FIG. 9 depicts an exemplary embodiment of an application interface 900 including a header and footer tab 901 to enable a representative to customize the header and footer of a container document. As shown in FIG. 9, header and footer tab 901 may include a header portion 902 that may enable the representative to define a header to appear at the top of a container document. As shown in FIG. 9, header portion 902 may include a toolbar 908 that enables the representative to add an image to the header, add a link to the header, customize the font for the header, and/or edit the HTML code comprising the header. As depicted, header portion 902 may display a mock-up of the header that may appear on the container document. FIGS. 17 and 18 also illustrate exemplary application interfaces that may enable a representative to customize the header and footer of a container document.

Header and footer tab 901 may also include a footer portion 903 that may enable the representative to define a footer to appear at the bottom of a container document, for example. A footer may include a link 904 associated with a privacy page, a link 905 associated with a terms of service page, a link 906 associated with a contact us page, and a link 907 associated with a service agreement page. Header and footer tab may also include an "add a link to the footer" element 909 that may enable the representative to add custom links to the footer of the container document, for example. As shown in FIG. 9, footer portion 903 may display a mock-up of the header that may appear on the container document.

Figure 19:
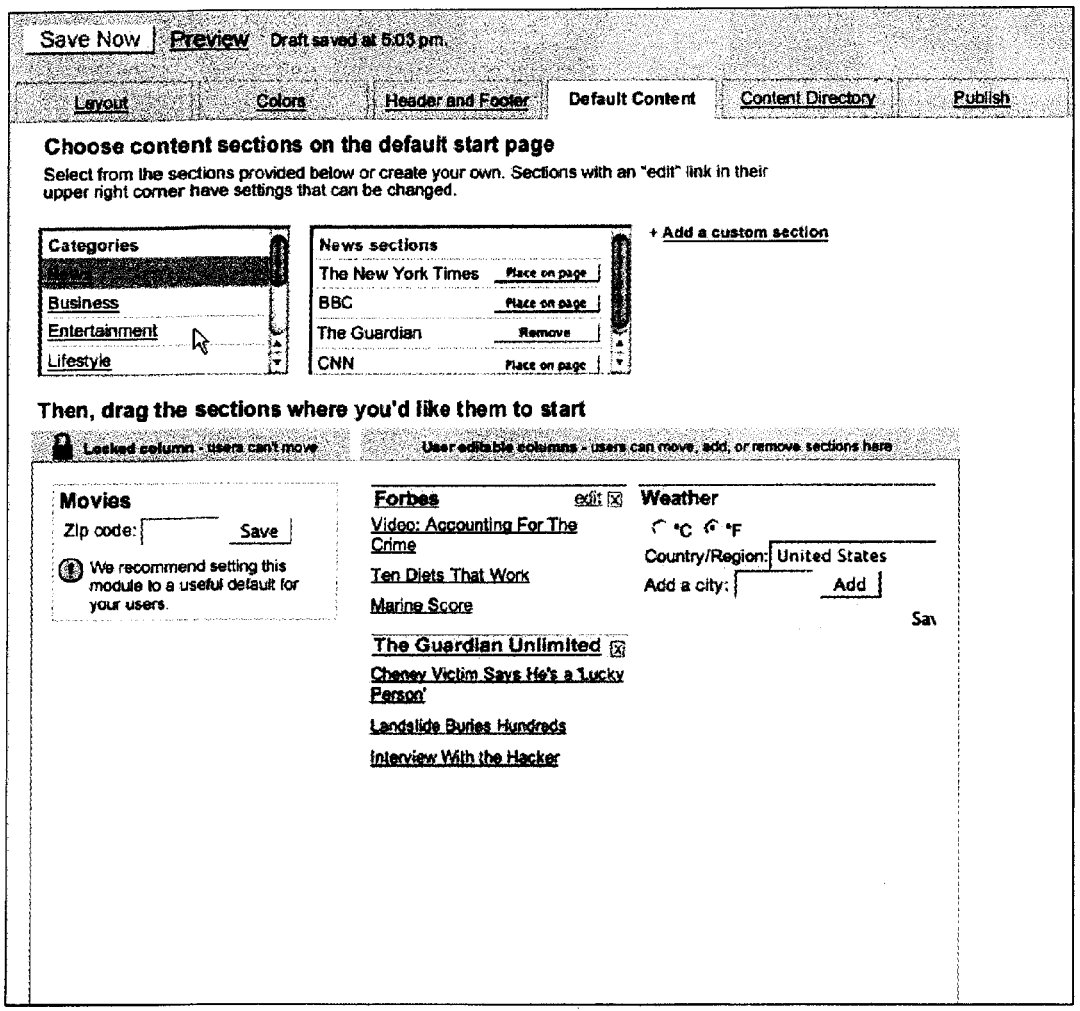
FIG. 19 depicts an illustrative application interface according to various embodiments of the present invention.
Figure 20:
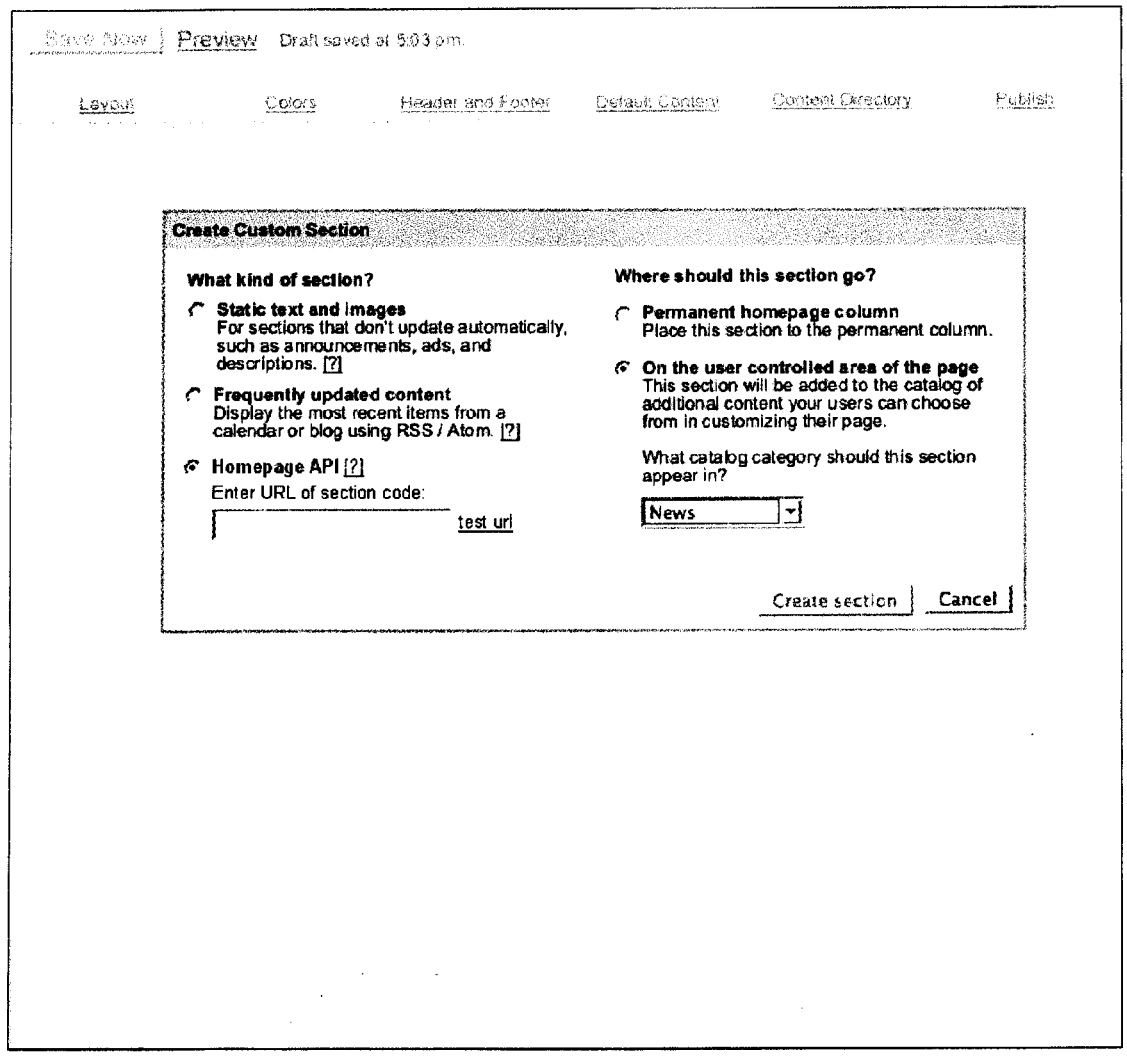
FIG. 20 depicts an illustrative application interface according to various embodiments of the present invention.
Figure 21:
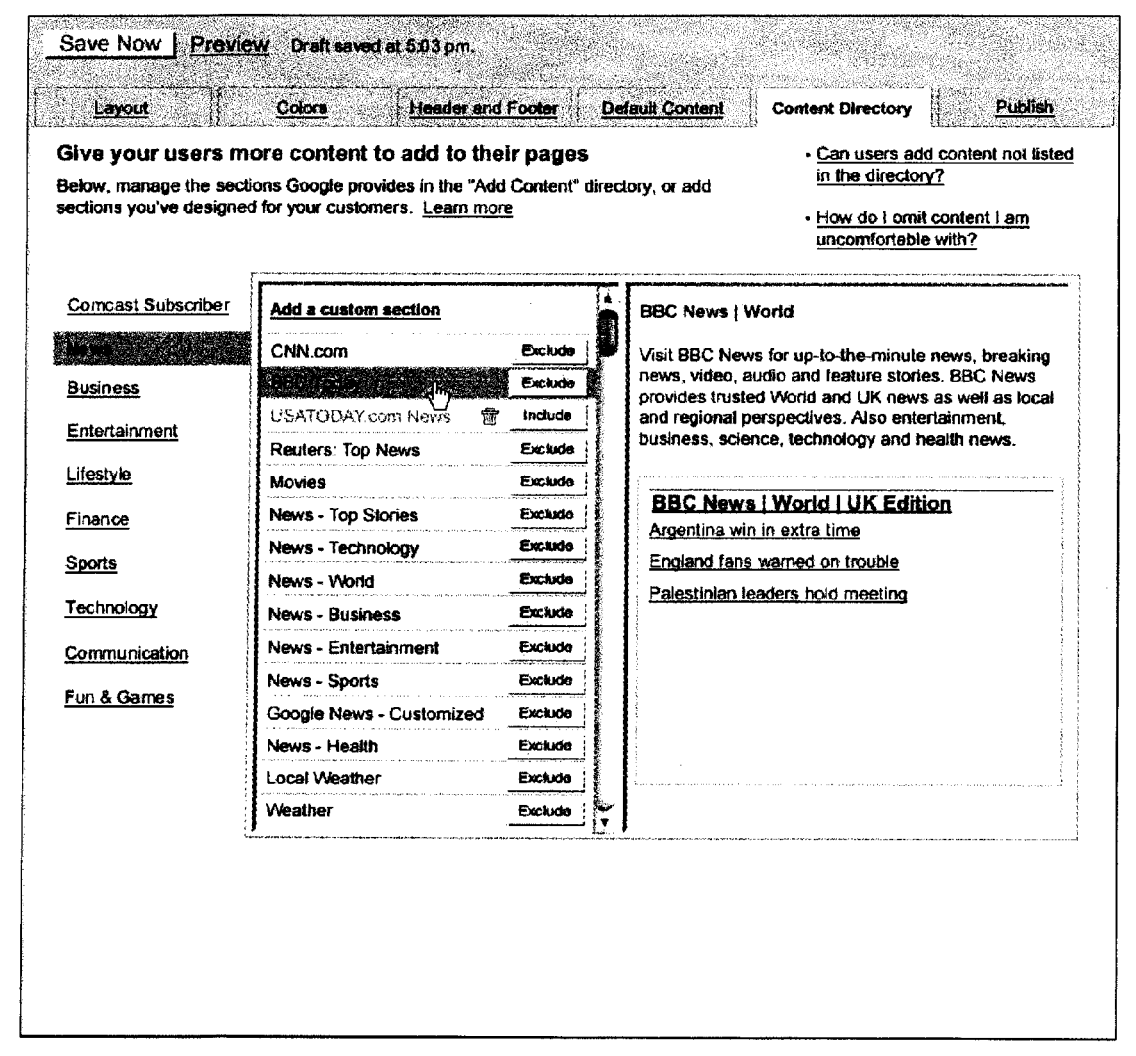

In block 508, content for the container document may be selected. In an exemplary embodiment, the representative may select from, for example, remote modules, or other modules (e.g., RSS, API-based modules, etc.) that may be included in the container document or create a custom module to be included in the container document. FIGS. 10-14 depict various example application interfaces for defining the content for a container document using remote modules and/or custom modules. FIGS. 19-21 also depict various example application interfaces for defining the content for a container document using remote modules and/or custom modules.

Figure 15:
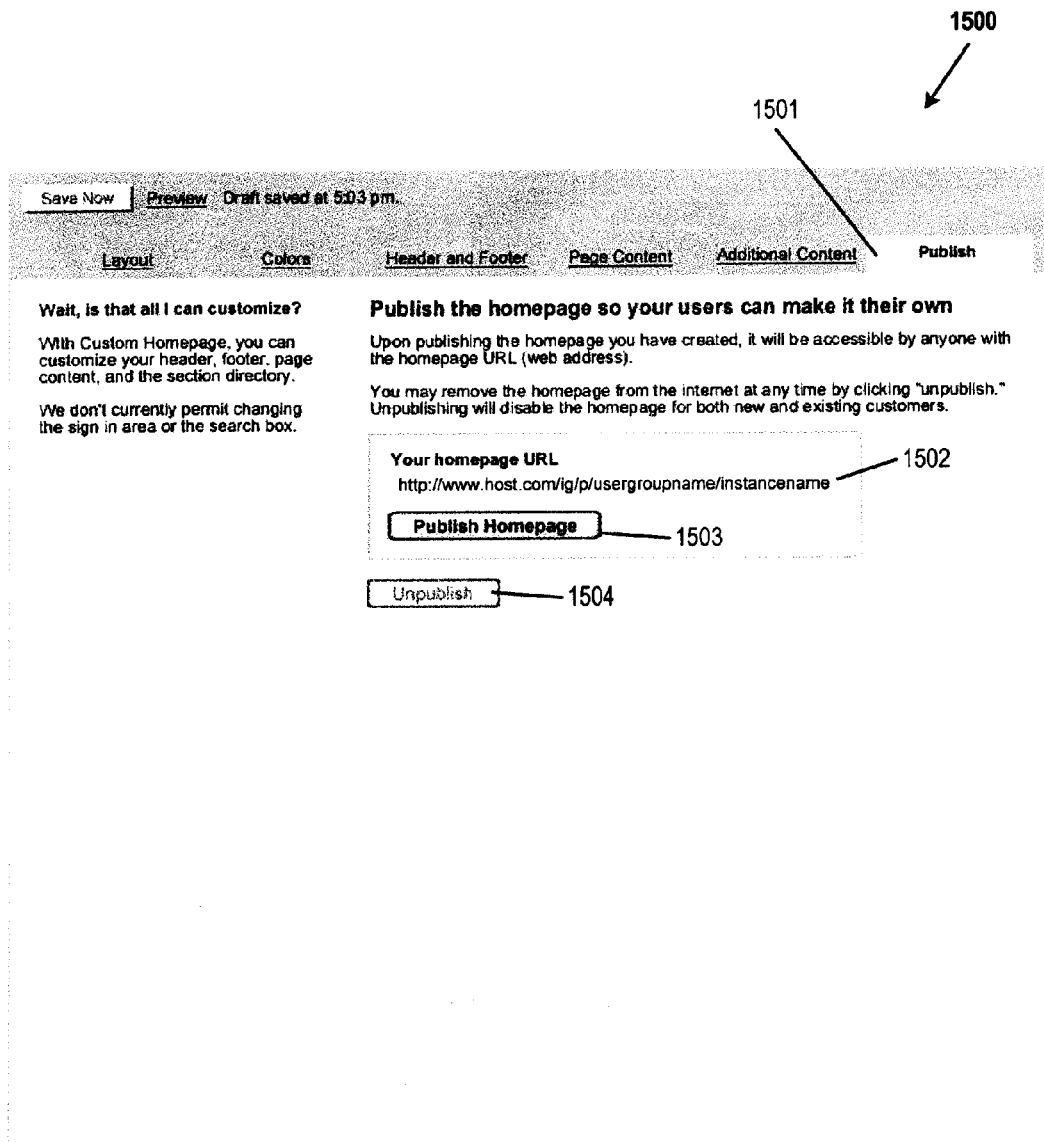
FIG. 15 depicts an illustrative application interface according to various embodiments of the present invention.

In block 509, the container document may be published. As referred to herein, publishing the container document may include any manner of making the container document available to users, including, but not limited to, saving the container document and indicating to the hosted server system that the container document is to be available to its users. FIG. 15 depicts an exemplary embodiment of an application interface 1500 including a publish tab 1501 to enable the representative to publish the container document. The representative may select the publish button 1503 to publish the page. In such an embodiment, the URL 1502 of the container document may be displayed. Publish tab 1501 may also include an unpublish button 1504 which may enable the representative to remove the published container document.

Illustrative Process for Accessing Personalized Container Document

In an exemplary embodiment, users of the user group may access a container document that has been configured by the user group, for example. As shown in FIG. 15, an exemplary URL for a container document may be, for example, "http://www.host.com/ig/p/usergroupname/instancename," where "www.host.com" may represent the domain of the hosted server system, "usergroupname" may represent the user group, and "instancename" may represent a particular container document. A user may also access the container document using, for example, the destination IP address of the "host." As will be described in greater detail below, a user group may have multiple instances of container documents for the users of the user group. In an exemplary embodiment, the "/p/" in the URL, for example, may indicate that the particular URL is associated with a container document associated with the user group.

Figure 16:
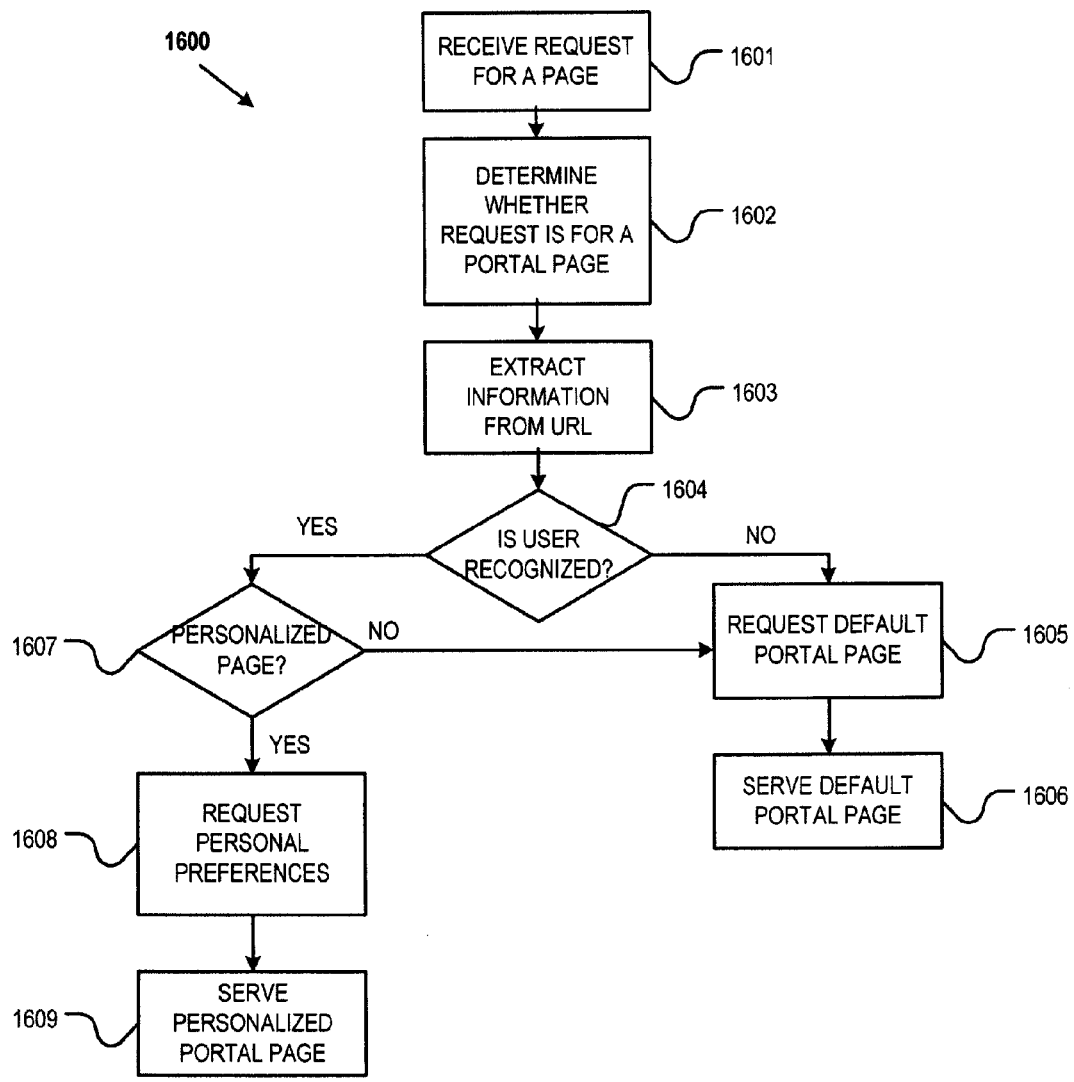
FIG. 16 depicts an illustrative process for serving a personalized container document according to various embodiments of the present invention.

FIG. 16 depicts an exemplary embodiment of a flow chart 1600, which illustrates a method for serving a container document and/or a personalized container document to a user of the user group according to an exemplary embodiment. In block 1601, a request for a page may be received. As noted above, the request may be a URL request or a request using the destination IP address (if known by the user) of the container document. The request may be received by the hosted server system, for example.

In block 1602, the hosted server system may determine whether the request is for a container document. As described above, the URL for a container document may be, for example, "http://www.host.com/ig/p/usergroupname/instancename" and the "/p/" may indicate that the URL is associated with a container document associated with a partner/user group. In one example, the user group may choose to hide this URL from the users by setting, for example, its own domain (e.g., www.usergroupname.com) to point to this URL via CNAME. The hosted server system may parse the URL to determine whether the "/p/" is present in the URL. If the "/p/" is present, then the hosted server system may proceed with serving the container document. If the "/p/" is not present, then the hosted server system may serve another page associated with the URL request. It is to be understood that other indicators and techniques for recognizing that the URL request is for a container document associated with a partner/user group may be used. For example, in one example, the URL for a container document may be "http://www.host.com/ig/usergroupname/instancename" and the "/usergroupname/instancename" may indicate that the URL is associated with a container document associated with a partner/user group.

In another example, a user may request a URL selected by the user group such as "start.usergroup.net." Upon receipt of this request, the hosted server system may determine a true path (e.g., "partnerpage.host.com/usergroup.net") associated with this request and decode the true path to determine the domain name. The hosted server system may then look up the domain name in a dynamic table or other dynamic storage module that is uniquely indexed by partner domain to determine how to function, for example.

In block 1603, information may be extracted from the URL. The identity of the user group and the particular instance of the container document may be extracted from the URL. For example, if the URL has a known format as described above, the hosted server system may parse the URL to extract the "usergroupname" and "instancename" strings from the URL. This information may then be used to look-up user group preferences and/or the personalized container document as will be explained in greater detail below.

Multiple Points of Entry

In block 1604, the hosted server system may determine whether the user is recognized. The system provided may provide for multiple points of entry, meaning that multiple different accounts may be used to enable a user to access a personalized partner container document. The user group (e.g., an admin user that sets up the user group container document) may select which authentication method(s) (i.e., point of entry) may be used to authenticate users of the user group. This authentication method may also be stored by the hosted server system in the dynamic table or other storage module that is uniquely indexed by partner domain. When the user makes a request for the container document and the domain name is looked up in this table, the authentication method also may be determined. Thus, the system may determine whether the user is recognized based on the domain name and the authentication method(s) associated with the domain name.

For example, a user may have an account with the hosted server system (e.g., Google) that is used for various activities on that hosted server system (e.g., email, data storage, personalized home page, etc.). Also, the same user may have an account with the partner whose container document the user is requesting (e.g., the user may be a customer of the partners). Therefore, if the authentication method to be used is associated with a particular account, the hosted server system may check to determine whether it has a record of the user associated with that particular account. Where, for example, an account with the hosted server system may be used to authenticate a user with more than one user group, the hosted server system may determine whether the user is recognized by a particular user group using the domain name and information associated with the hosted server system account to authenticate the hosted server system account to that particular domain name. The hosted server system also may examine one or more cookies, for example, on the user's system to determine whether the user is recognized as having an account with the hosted server system if an anonymous/cookie-based authentication method is indicated in the dynamic table that is uniquely indexed by partner domain. If the user is not recognized or not logged in according to the user group selected authentication method for the container document, for example, flow chart 1600 may proceed to block 1605. If the user is recognized or logged in, flow chart 1600 may proceed to block 1607.

In block 1605, the hosted server system may issue a request to the configuration server, for example, to retrieve the preferences of the user group container document. In an exemplary embodiment, the request may include an identification of the user group, other information about the user group, and the instance name of the container document that has been requested. To determine the identification of the user group, the hosted server system may convert the "usergroupname" into a unique identifier that may be associated with an account of the user group. To convert the "usergroupname," the hosted server system may look up that user group's identifier in a local map file, for example. Other information associated with the user group may be retrieved using similar look-up techniques. The configuration server may receive this request and then look up further user group information.

In block 1606, the hosted server system may serve a default container document. The hosted server system may receive information regarding the default container document into a user group data packet and a display preference data packet, for example. The user group data packet may specify the layout (e.g., header or no header, fixed column or no fixed columns, etc.), skinning preferences (e.g., colors), and the taxonomy, for example. The display preference data packet may specify default settings for each container document, for example. The hosted server system may then use this information to serve the default container document to the user. The resulting container document may contain the content configured by the user group and the default settings configured by the user group for any of the content that may be configured by the user.

In block 1607, the hosted server system may determine whether the user has personalized the container document in accordance with the user's personal preferences. To do so, it may identify the user through the user group-selected authentication method mentioned above. Specifically, it may enable the user to log-in using the partner account information, the hosted server system account information or some other information as selected by the user group. To enable this to occur, the account log-ins valid for a user to receive a partner container document may be stored at the hosted server system in association with the partner container document data. So, for example, if the partner is a computer company, Computers4Sale, and they have a partner container document that is a partner-based Google Personalized Home Page, the user should be able to access the Computers4Sale Google Personalized Home Page by logging in to Google using a Google account (if the selected authentication method authenticates users via an account with the hosted server system), or by logging into Computers4Sale using a Computers4Sale account that Google has stored in its list of users for the Computers4Sale Google Personalized Home Page (if the selected authentication method authenticates users via an account with the partner).

As described above, based on the taxonomy defined by the user group, a user may personalize (e.g., select which modules may be included in the personalized container document, apply personal preferences to those modules, determine the location of those modules within the container page, etc.) the container document associated with the user group. In one example, a user may personalize the container document without logging in to Google, for example. In this example, the user may customize a container document in an "offline" environment (e.g., the user is not logged-in). The customizations may be stored in a cookie, for example, so that when the user does log in for the first time (or the first time after making "offline" customizations), the cookie-based preferences may be transferred to the server.

If the user has personalized the partner container document, in block 1607, instead of the default settings being applied to the partner container document, the user's personal settings may be applied to the container document. The hosted server system may determine whether the user is recognized and whether the user has personalized the container document simultaneously. If the user has not personalized the container document, flow chart 1600 may proceed to block 1605.

In block 1608, the hosted server system may request the user's personal preferences. These personal preferences may be stored in a database system that is associated with the hosted server system.

In block 1609, the hosted server system may serve a personalized partner container document. The hosted server system may receive information regarding the container document in a user group data packet and a display preference data packet, for example. The user group data packet may specify the layout (e.g., header or no header, fixed column or no fixed columns, etc.), skinning preferences (e.g., colors), and the taxonomy, for example. The user may also add additional non-group content if the user group has configured the container document in a manner that permits the user to do so. The display preference data packet may specify a user's personal settings for each container document, for example. The hosted server system may then use this information to serve the personalized container document to the user. The resulting personalized container document may contain the content configured by the user group and the personalized settings configured by the user, for example.

Figure 22:
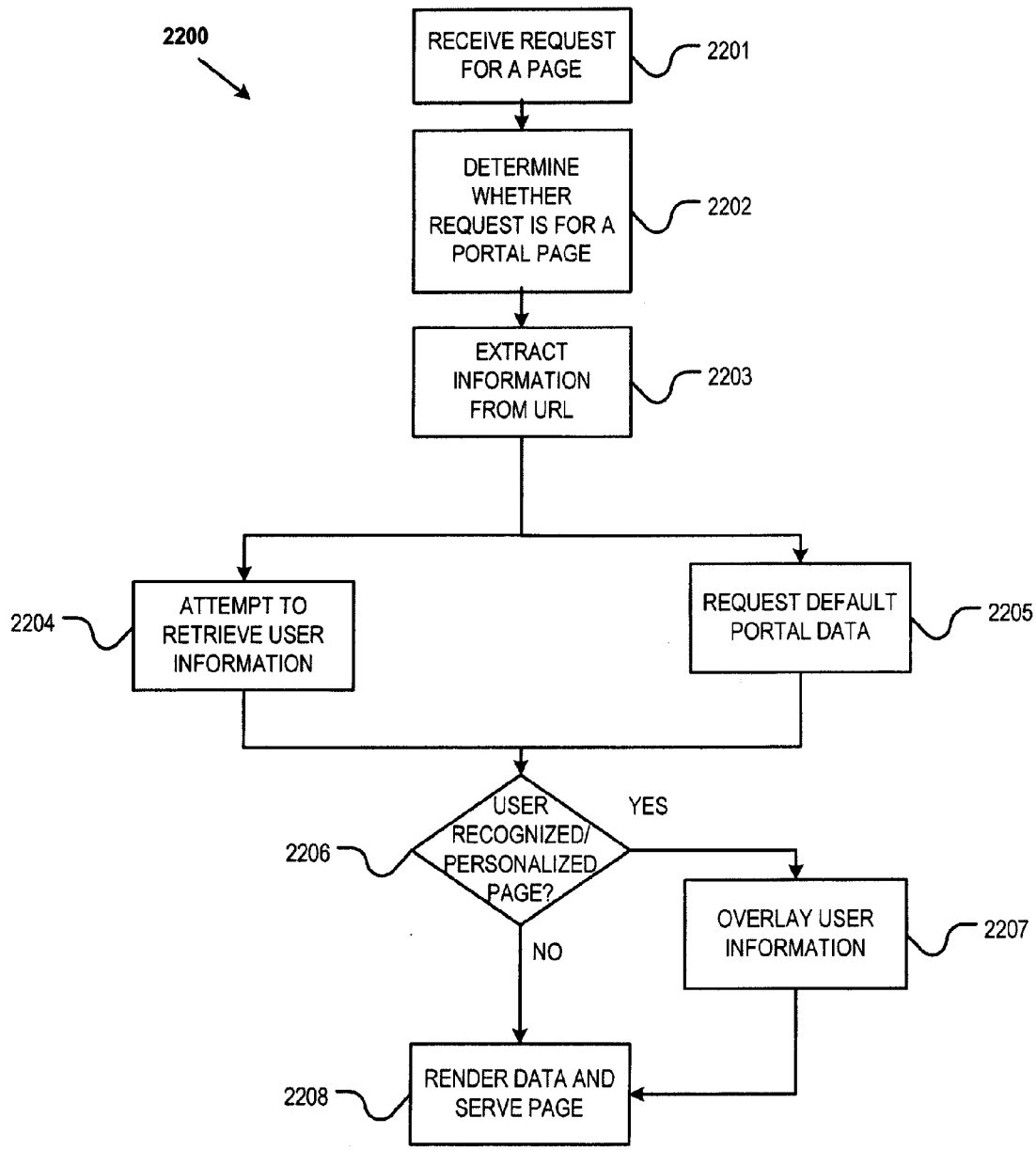
FIG. 22 depicts an illustrative process for serving a personalized container document according to various embodiments of the present invention.

FIG. 22 also depicts an exemplary embodiment of a flow chart 2200, which illustrates a method for serving a container document and/or a personalized container document to a user of the user group blocks 2201-2203 operating as described above for blocks 1601-1603.

In the example shown in FIG. 22, blocks 2204 and 2205 may operate in parallel. In block 2204, user information may be retrieved. The user group may select an authentication method for authenticating users of the user group. Thus, to retrieve user information, the hosted server system, for example, may the system may check for information the account identified by the authentication method. For example, a user may have an account with the hosted server system (e.g., Google) that is used for various activities on that hosted server system (e.g., email, data storage, personalized home page, etc.). Also, the same user may have an account with the partner whose container document the user is requesting (e.g., the user may be a customer of the partners). Therefore, based on the authentication method, the hosted server system may check to determine whether it has a record of the user being logged in with the account identified with the authentication method. If the user group has selected an anonymous/cookie-based authentication method, the hosted server system may examine one or more cookies, for example, on the user's system to determine whether the user is recognized.

In block 2205, default portal data may be requested. To request portal date, the hosted server system may issue a request to the configuration server, for example, to retrieve the preferences of the user group container document.

In block 2206, the hosted server system may determine whether the user is recognized and whether the user has a personalized container document. To do so, it may identify the user through one or more of the multiple points of entry mentioned above. Specifically, it may enable the user to log-in using the partner account information, the hosted server system account information or some other information. The hosted server system may, for example, examine user cookies to determine whether the user has personalized the container document. The hosted server system may determine whether the user is recognized and whether the user has personalized the container document simultaneously. If the user has personalized the container document, flow chart 2200 may proceed to block 2207. If the user has not personalized the container document, flow chart 2200 may proceed to block 2208.

In block 2207, user information may be overlaid onto the container document. To overlay information onto the container document, the content selected by the partner/user group, for example, may be combined with the user's customizations to form the container document.

In block 2208, the data for the container document may be rendered and the container document may be served to the user.

Data Driven Design

A user group may have multiple container documents associated with the user group. In that case, each portal page may be a separate instance. Where, as described above, the URL for each personalized container document is "http://www.host.com/ig/p/usergroupname/instancename," each instance may be uniquely identified by a different "instancename," for example. In an example where the URL request is start.mydomain.net/instancename, each instance may also be identified by a different "instancename." A user may specifically request an instance or the hosted server system and/or configuration server system may determine which instance to serve to the user by examining cookies on the user system or other information about the user, for example. Also, the hosted server system may determine which instance to serve based on an IP address, geocoded information, or other external information, such as information known to the user group but not to the hosted server system. Selecting instances in this manner enables a partner to use its knowledge of its end users to determine which of several pages to serve the end user by default, for example.

Varying Content Based on Geographic Location

One or more instances may be based on varying the content that is presented to different users. For example, the user group may vary the content presented to its users based on a variety of data inputs, including geographic location, user demographics, time of day, time of year, etc. In the geographic location example, users on the East coast of the United States may receive an instance associated with the East coast of the United States, while users on the West coast of the United States may receive a different instance that is associated with the West coast of the United States. In another example, the content may be varied based on the specific city in which the user is located. In such an example, the hosted server system may determine the location of the user by determining whether the user has access to a wireless access point (e.g., WIFI or some other wireless protocol). From that determination, the hosted server system may determine the city in which the wireless access point is located and serve the user an instance associated with that city. Content in that instance may include, for example, a travel module that shows flights available from the airport nearest to that city. The content may also include, for example a weather module that shows the current weather for that city.

Varying Content Based on Levels of Service

Content may be varied based on, for example, levels of user service. For example, where the user group may have users of varying status (e.g., silver, gold, platinum), the user group may vary the content presented to its users based on those status levels. In such an example, the hosted server system and/or configuration server system may determine which instance to serve to the user by examining cookies on the user system or other information about the user, for example. In one exemplary embodiment, the user group may be associated with an airline, for example. In such an embodiment, the airline may have a frequent flier program and users may be enrolled in that program. If a user has status within that program, the hosted server system may serve the user a container document associated with that status level. For example, if a user has silver status, the instance associated with silver status may include a module with information on how to obtain a higher status level. If the user has platinum status, for example, the instance associated with platinum status may include a module that allows the user to automatically upgrade to first class on an upcoming flight.

A service provider may have users with various levels of service agreements. For example, some users within the user group may have an "at-home" service agreement while other users within the user group may have a "basic" service agreement that requires the user to send the item in for repairs. In such an example, the instance associated with the "at-home" service agreement may include a module for setting up an at-home service call. The instance associated with the "basic" service agreement may include a module that provides instructions on where to send the item for repairs based on the user's geographic region, for example.

Subscription Based Content

Partner/user groups may also vary content based on subscriptions. For example, some user may subscribe to "premium" content. Those users that subscribe to the "premium" content may be served an instance containing a module including the "premium" content. Also, users may subscribe to content-based modules. For example, the partner may offer a music module and a subscription to the partner's music module may enable the user to choose certain selections of music to hear based on subscriptions. Also, within the music module, the partner may offer different subscriptions. For example, one subscription may permit an end user to listen to music, while another may permit the user to listen to and download music. In these examples, the partner may charge the user a fee for the subscription, thus enabling the partner to monetize modules within the container document.

Selective Internationalization

Instances of a partner container document may be associated with different languages. In such an embodiment, the hosted server system and/or the configuration server system may, for example, determine the location of the user as described above and serve an instance of a container document that is in a language associated with the location of the user. For example, users in the United States may be served an instance of container document that is in American English, users in the United Kingdom may be served an instance of a container document that is in British English, and users in France may be served an instance of a container document that is in French. Also, partner or user profiles may identify a language preference and such preferences may be used to internationalization the container document based on such content. Different versions of the container document may be provided for the different languages as well.

The multiple instances for a user group may be based on a common template. For example, in the example described above regarding the airline module, each instance of the container document may include the module showing flights, with the content within the module varying based on the geographic location. In another embodiment, the multiple instances may not be based on a common template, with each instance being unique.

Illustrative Configuration User Interface

As described above, a representative associated with the user group may configure the container documents for the users of the user group through a web application. Such an application may include a user interface for configuring and/or defining the container document may be interactive. Such an interface would permit the representative to view a fully-functional preview of the actual content that is not yet published. The interface may also permit the representative to edit the content within the fully-functional preview.

Live Container Document Preview

There may also be many interconnected components of the user interface. When changes are made using one of the components, the other components may need to be synchronized. To synchronize the components of a user interface, the components may observe each other to recognize the changes and update accordingly. The source of the change (e.g., the page content tab) may "push" the change to all observers. For example, if a checkbox for a module is unchecked in a module taxonomy selection portion on the available content tab, the module should disappear in the module taxonomy selection portion on the selected modules tab. In such an example, the checkbox may "push" the change to the selected modules tab.

Observers may also actively poll the sources of changes for changes to the interface. For example, the components of the user interface may periodically poll the backend layer to determine whether any of the files associated with the user group have changed. If so, the changes may be updated immediately in the other components of the interface. The following examples may be considered. In one example, when a user is editing the colors of the container document using the colors tab described above, all of the components of the colors tab may be registered with a central party (i.e., an event registrar) for an interest in an event to "synchronize color." When one of the components in the colors tab reflects a change, the component may notify the event registrar, which may, in turn, notify all of the components registered for the "synchronize color" event.

Search Box Within Container Document

As described above with regard to FIG. 2, in various exemplary embodiments, a container document may include a search box. In such embodiments, a search box may be associated with a host of the container document. When a user of the container document enters text into a text field and executes a search, search results may be returned to the user. In some instances, the search results may include links associated with advertisements. If the user subsequently click on one of the links associated with an advertisement, the host of the container document may compensate the user group. The host may credit an account of the user group, for example. The manner of revenue sharing between the host and user group may involve a percentage of revenue, a flat fee arrangement (e.g., a specific amount per click), or other arrangements known in this field.

Example Hosted Server System for Serving Container Documents

The operation of a hosted server system may involve a number of tasks and units as described in the '930 application. For background, a brief description of units that may be used to serve the container document is provided relative to FIG. 1(c). There, a hosted server system 10 includes a plurality of units which may include a container server 12, a module server 14, a specification server 16, a back end server 18, an analysis unit 28, a module creation server 32, a syndication server 34, an advertisement server 36, a geocode server 37 and/or a map server 39.

Other systems connected to network 26 may comprise one or more user systems 22, one or more remote source systems 24, one or more module developer systems 30, one or more content providers, and one or more syndication recipient servers 38. In addition, one or more database systems 20 may operate in conjunction with the various units of hosted server system 10.

Container server 12 (e.g., a web server) may serve the container document to user systems 22 over network 26. Container server 12 may take data and/or instructions and may formulate a container for transmission over the network to the user system 22.

Module server 14 may provide data from modules to container server 12 for incorporation into a container document. It should be appreciated that in one embodiment, container server 12 and module server 14 may comprise a single unit performing both functions. Module server 14 may provide data for the container document by interpreting and/or parsing instructions in the module specification associated with the module. According to one embodiment, module server 14 may serve the module content to the container document through the use of a browser IFRAME. An IFRAME may be generally understood to be an independently operated browser window instance inside the container document. One advantage of an IFRAME is that is protects the container document from the IFRAME's content and vice versa, e.g., JavaScript on the container document may not be permitted to access any JavaScript code in the inner IFRAME (same for CSS, DOM, or cookie objects).

Multiple Choices of Module Formats

To expedite display of container documents, modules may be displayed inline within the container document. Inline display may be understood as referring to display with other document elements. One example is a display generated from code for HTML in the body according to HTML standards. In one embodiment, module server 14 or some other component may determine whether the module is deemed trusted prior to including it in the container document inline due to the risks of various security issues an inline module could create. According to one embodiment, the module may incorporate an indicia of approval (e.g., digital certificate) issued by the container module or an entity associated with the container module as described in detail below. If the indocile of approval is present, module server 14 may render the data from a module for inline presentation in the container document.

Specification server 16 provides the module specification file to module server 14. The module specification may be cached and stored in a database accessible to the module server 14 and/or specification server 16 or may be retrieved from a location associated with the specification as detailed later. For example, specification server 16 may reside on a remote source system 24. In addition, specification server 16 may be connected to module server over a network with the module specification located at another location on the network accessible to specification server 16.

Backend server 18 may be provided for interacting with one or more databases (e.g., large or dynamic databases of information). For example, for a news module that obtains frequent updates and demands a flow of data, (e.g., from an RSS feed), backend server 18 may format the data into HTML for the container.

In one specific example, a person may create a module (e.g., a maps module), such as one that uses an application program interface (API) to an existing mapping program to create a module to display a map of downtown Mountain View, Calif. The module may comprise an XML specification file or module specification file stored on a specification server. The specification server may comprise any server, including one on the site from which the container page is hosted or any other site. The user or another person may then include this new module on a personalized homepage (container document). The server that serves the container document may operate as the module server and the server that generates the mapping data through an inquiry from its API may be considered to be the backend server.

According to one embodiment of the present invention, analysis unit 28 may analyze modules at various times (e.g., when the module is first selected by a user, each time the module is called by a container for inclusion or at any other time determined to be advantageous for safety and security and other times). Analysis unit 28 may perform a number of actions, including comparing the module with a list of disapproved or dangerous modules or a list of approved modules. The comparison may involve exact or substring (e.g., prefixes, suffixes and regular expressions) matching by name or location (e.g., URL), contents of the specification, contents of the location where the specification resides, or information that may be ascertainable about the module. Analysis unit 28 may take one or more actions in response to a determination that the module is disapproved or dangerous, including, for example, silently blocking the request, (i.e., providing a generic error), blocking the request with an error that explains the reason it was blocked or redirecting the request to a different module specification that has been determined to be safe and related to the disapproved module (e.g., another module that relates to maps, if the first one was a disapproved mapping site or a module that includes the keyword "basketball" if the disapproved module was a basketball module). For example, through redirection, the URL of the original module may be passed to the "safe" module. The safe module may then use a proxy server, as described below, to retrieve the original URL's content. Developers may then replace the error handler to fix small bugs in the original module to be able to display the content of the original module. In another embodiment, analysis unit 28 may parse the module content to determine whether it is safe, such as by compiling JavaScript or other scripts contained in the module to try to identify unsafe or undesired actions the module may perform.

One or more content providers 31 may be provided. Content providers 31 may provide the content to be served in modules and/or may provide modules to be served to end users. Examples of a content provider include but are not limited to a provider of a module, a news feed, a source of traffic information, a source of financial information, a source of entertainment information.

One or more module creation servers 32 may be provided. This server may operate as a "wizard" to enable module creators to create a module through an interactive process controlled by module creation server 32. For example, module creation server 32 may provide a series of user interfaces that enable the module creator to provide inputs that are then used by the module creator to automatically generate a module specification. For example, various module specification templates may be provided with corresponding inputs. Module creation server 32 may then take inputs supplied by a module creator, insert them into the template and then generate the module specification for the module. A preview, testing and debugging function may also be offered as part of this "wizard." This web tool and/or downloadable application may be downloadable as well so it may be installed and operated at any node on the network. In various embodiments of the invention, the module creator may be a representative associated with a user group. Also, the module creator may be an example of a content provider.

A syndication server 34 may prepare data for transmission to one or more syndication recipient servers 38 related to modules. Syndication server 34 may receive a request for a module and/or module content and deliver that module or content to a syndication recipient server 38 over network 26. Syndication server 34 may reside at hosted server system 10 or at another location on the network. For example, if an operator of a sports web site (an example of a syndication recipient system 38) desired to include a maps module created by a remote source system 24, it may do so through a request to syndication server 34. Syndication server 34 may then cooperate with module server 14 to generate data for the container document (here the sports web site page of the syndication recipient system 38). That may involve retrieving the module specification from remote source system 24, supplying preferences received from the syndication recipient server 38 (e.g., city information for the sports team of a page being displayed) and/or generating data for the container. It is also possible that the data may be rendered at syndication recipient server 38 into its container document in either an IFRAME or inline. Syndication server 34 may thus syndicate modules accessible to it. It may do so based on requests for specific modules or other criteria it determines (e.g., content matches, keyword matches, monetary values associated with modules and/or syndication requestors, etc.)

Ad server 36 may provide advertisements associated with modules to containers. For example, an advertisement may be incorporated with module data when data is delivered to a container document. Ad server 36 may operate with syndication server 34 to deliver advertisements to syndication recipient servers 38 based on a syndication request for a module. The advertisements may be selected by ad server 36 based on a wide variety of criteria, including, but not limited to, the relationship between the content of or information about the container, module, other modules in the container, syndication recipient server information, monetary elements/relationships related to any of the foregoing and/or combinations thereof. Ad server 36 may comprise the Google AdSense system, according to one embodiment of the present invention.

A geocode server 37 may be provided to generate geocode information from location descriptions as is known in the art. A geocode server 37 may generate latitude and longitude numeric values from geographic locations.

A map server 39 may generate map output. Mapping systems, such as Google Maps and Google Earth, may be used to generate this data.

One or more database systems 20 may be provided that store, in any number of ways, container information, module specifications and/or related information, formatting data, per-user and per-module preference data, remote module ID data, remote module location reference data, advertisement data, advertiser data, content/monetary data, syndication recipient data, templates for modules, inputs for modules, lists of trusted and untrusted modules, approval criteria and related information and/or any other information used by the modules to operate as described herein. While a single database structure is shown for database system 20, it is well understood that the data may be stored at a number of locations and in one or more systems.

In addition, what is shown as user system 22 may also operate as a remote source system 24 and/or a module developer system 30. In other words, one computer system may operate in different capacities: as a user system, as a remote source system, as a syndication server, as a target content server, and/or a module developer system. In addition, as explained in greater detail below, each of the modules depicted within hosted server system 10 may also be disposed at a user system 22, a remote source system 24, or a module developer system 30. Similarly, databases 20 may be associated with each of the modules depicted within FIG. 1(c) depending upon the configuration desired.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method comprising:
receiving, from a first client device, an identification of user group configuration settings for a user group comprising a plurality of users, the user group configuration settings identifying (i) a first plurality of content items available to be retrieved from a first plurality of remote content provider servers and to be provided in web pages of the user group for use by users in the user group, and (ii) the plurality of users in the user group;
receiving, from a second client device that is different than the first client device, data identifying personal configuration settings that personalize a web page of the user group for a first user, the personal configuration settings for the first user specifying a second plurality of content items selected by the first user to be retrieved from a second plurality of remote content provider servers and to be included in the web page of the user group personalized for the first user;
receiving, from the second client device, a request that identifies the web page of the user group, wherein the request includes a universal resource locator (URL) identifying the user group;
in response to receiving the request that identifies the web page of the user group, determining, at least partly based on parsing the URL, that (i) the web page requested is for the user group, (ii) a user of the second client device is in the user group that includes the web page identified by the request, and (iii) the data identifying personal configuration settings that personalize the web page of the user group to the first user was previously received;
in response to determining that (i) the web page requested is for the user group, (ii) the user of the second client device is in the user group that includes the web page identified by the request, and (iii) the data identifying personal configuration settings that personalize the web page of the user group to the first user was previously received, generating a first personal web page in accordance with both the user group configuration settings for the user group that identify (i) the first plurality of content items available to be retrieved from the first plurality of remote content provider servers and to be provided in web pages of the user group for use by users in the user group, and (ii) the plurality of users in the user group, and the personal configuration settings that personalize the web page of the user group to the first user, the first personal web page including:
one or more visualizations of one or more of a first plurality of content modules that provide the first plurality of content items from the first plurality of remote content provider servers; and
one or more visualizations of a second plurality of content modules that provide the second plurality of content items from the second plurality of remote content provider servers; and
sending the first personal web page over a network to the second client device.

2. The method of claim 1, wherein the personal configuration settings for the first user comprise a modification to the user group configuration settings, and generating the first personal web page comprises generating the first personal web page based on the personal configuration settings for a first user and the user group configuration settings as modified by the personal configuration settings for a first user.

3. The method of claim 1, wherein the user group configuration settings include a freeze setting that prevents the users from selecting personal configuration settings that modify the user group configuration settings.

4. The method of claim 1, further comprising sending a software application to a client, wherein execution of the software application by the client provides a graphical user interface that allows selection of user group configuration settings, and the received identification of user group configuration settings includes data generated based on a user interaction with the graphical user interface.

5. The method of claim 4, wherein the software application comprises at least one of a standalone application or a web application.

6. The method of claim 1, wherein the user group configuration settings specify an authentication method to authenticate the users in the user group.

7. The method of claim 6, wherein sending the first personal web page over a network to the first client device comprises authenticating a user of the first client device according to the authentication method.

8. The method of claim 1, wherein the user group configuration settings specify a domain name to be associated with the user group.

9. The method of claim 1, further comprising storing at least a portion of the user group configuration settings in a dynamic table.

10. The method of claim 1, further comprising sending the generated first personal web page to a client device over a network in a secure manner.

11. The method of claim 1, further comprising storing at least a portion of the user group configuration settings using a scalable storage system platform.

12. The method of claim 1, wherein generating the first personal web page comprises retrieving at least one of the user group configuration settings or the personal configuration settings for the first user from a configuration server.

13. The method of claim 1, wherein receiving an identification of user group configuration settings comprises using a configuration server to store the identification of user group configuration settings, the configuration server including:
a first layer to provide a user interface to a client and receive data from the user interface;
a second layer to verify the data received by the first layer from the user interface and to convert the verified data into a predetermined format;
a third layer to receive the converted data from the second layer and provide instructions to a fourth layer; and
a fourth layer to upload the converted data to a data storage system based on interactions with the third layer.

14. The computer-implemented method of claim 1, wherein the one or more of the first plurality of content modules included in the first personal web page correspond to the one or more of the first plurality of content modules included in a second personal web page.

15. A system, comprising:
a non-transitory computer memory; and
at least one hardware processor interoperably coupled with the non-transitory computer memory and configured to perform operations including:
receiving, from a first client device, an identification of user group configuration settings for a user group comprising a plurality of users, the user group configuration settings identifying (i) a first plurality of content items available to be retrieved from a first plurality of remote content provider servers and to be provided in web pages of the user group for use by users in the user group, and (ii) the plurality of users in the user group;
receiving, from a second client device that is different than the first client device, data identifying personal configuration settings that personalize a web page of the user group for a first user, the personal configuration settings for the first user specifying a second plurality of content items selected by the first user to be retrieved from a second plurality of remote content provider servers and to be included in the web page of the user group personalized for the first user;
receiving, from the second client device, a request that identifies the web page of the user group, wherein the request includes a universal resource locator (URL) identifying the user group;
in response to receiving the request that identifies the web page of the user group, determining, at least partly based on parsing the URL, that (i) the web page requested is for the user group, (ii) a user of the second client device is in the user group that includes the web page identified by the request, and (iii) the data identifying personal configuration settings that personalize the web page of the user group to the first user was previously received;
in response to determining that (i) the web page requested is for the user group, (ii) the user of the second client device is in the user group that includes the web page identified by the request, and (iii) the data identifying personal configuration settings that personalize the web page of the user group to the first user was previously received, generating a first personal web page in accordance with both the user group configuration settings for the user group that identify (i) the first plurality of content items available to be retrieved from the first plurality of remote content provider servers and to be provided in web pages of the user group for use by users in the user group, and (ii) the plurality of users in the user group, and the personal configuration settings that personalize the web page of the user group to the first user, the first personal web page including:
one or more visualizations of one or more of a first plurality of content modules that provide the first plurality of content items from the first plurality of remote content provider servers; and
one or more visualizations of a second plurality of content modules that provide the second plurality of content items from the second plurality of remote content provider servers; and
sending the first personal web page over a network to the second client device.

16. The system of claim 15, wherein the personal configuration settings for the first user comprise a modification to the user group configuration settings, and generating the first personal web page comprises generating the first personal web page based on the personal configuration settings for a first user and the user group configuration settings as modified by the personal configuration settings for a first user.

17. The system of claim 15, wherein the user group configuration settings include a freeze setting that prevents the users from selecting personal configuration settings that modify the user group configuration settings.

18. The system of claim 15, the operations further comprising sending a software application to a client, wherein execution of the software application by the client provides a graphical user interface that allows selection of user group configuration settings, and the received identification of user group configuration settings includes data generated based on a user interaction with the graphical user interface.

19. The system of claim 18, wherein the software application comprises at least one of a standalone application or a web application.

20. The system of claim 15, wherein the user group configuration settings specify an authentication method to authenticate the users in the user group.

21. The system of claim 20, wherein sending the first personal web page over a network to the first client device comprises authenticating a user of the first client device according to the authentication method.

22. The system of claim 15, wherein the user group configuration settings specify a domain name to be associated with the user group.

23. The system of claim 15, the operations further comprising storing at least a portion of the user group configuration settings in a dynamic table.

24. The system of claim 15, the operations further comprising sending the generated first personal web page to a client device over a network in a secure manner.

25. The system of claim 15, further comprising storing at least a portion of the user group configuration settings using a scalable storage system platform.

26. The system of claim 15, wherein generating the first personal web page comprises retrieving at least one of the user group configuration settings or the personal configuration settings for the first user from a configuration server.

27. The system of claim 15, wherein receiving an identification of user group configuration settings comprises using a configuration server to store the identification of user group configuration settings, the configuration server including:
a first layer to provide a user interface to a client and receive data from the user interface;
a second layer to verify the data received by the first layer from the user interface and to convert the verified data into a predetermined format;
a third layer to receive the converted data from the second layer and provide instructions to a fourth layer; and
a fourth layer to upload the converted data to a data storage system based on interactions with the third layer.

28. The system of claim 15, wherein the one or more of the first plurality of content modules included in the first personal web page correspond to the one or more of the first plurality of content modules included in a second personal web page.

29. An article comprising a computer-readable, tangible, non-transitory storage medium storing instructions that are operable when executed to cause data processing apparatus to perform operations including:
receiving, from a first client device, an identification of user group configuration settings for a user group comprising a plurality of users, the user group configuration settings identifying (i) a first plurality of content items available to be retrieved from a first plurality of remote content provider servers and to be provided in web pages of the user group for use by users in the user group, and (ii) the plurality of users in the user group;
receiving, from a second client device that is different than the first client device, data identifying personal configuration settings that personalize a web page of the user group for a first user, the personal configuration settings for the first user specifying a second plurality of content items selected by the first user to be retrieved from a second plurality of remote content provider servers and to be included in the web page of the user group personalized for the first user;
receiving, from the second client device, a request that identifies the web page of the user group, wherein the request includes a universal resource locator (URL) identifying the user group;
in response to receiving the request that identifies the web page of the user group, determining, at least partly based on parsing the URL, that (i) the web page requested is for the user group, (ii) a user of the second client device is in the user group that includes the web page identified by the request, and (iii) the data identifying personal configuration settings that personalize the web page of the user group to the first user was previously received;
in response to determining that (i) the web page requested is for the user group, (ii) the user of the second client device is in the user group that includes the web page identified by the request, and (iii) the data identifying personal configuration settings that personalize the web page of the user group to the first user was previously received, generating a first personal web page in accordance with both the user group configuration settings for the user group that identify (i) the first plurality of content items available to be retrieved from the first plurality of remote content provider servers and to be provided in web pages of the user group for use by users in the user group, and (ii) the plurality of users in the user group, and the personal configuration settings that personalize the web page of the user group to the first user, the first personal web page including:
one or more visualizations of one or more of a first plurality of content modules that provide the first plurality of content items from the first plurality of remote content provider servers; and
one or more visualizations of a second plurality of content modules that provide the second plurality of content items from the second plurality of remote content provider servers; and
sending the first personal web page over a network to the second client device.

30. The article of claim 29, wherein the personal configuration settings for the first user comprise a modification to the user group configuration settings, and generating the first personal web page comprises generating the first personal web page based on the personal configuration settings for a first user and the user group configuration settings as modified by the personal configuration settings for a first user.

31. The article of claim 29, wherein the user group configuration settings include a freeze setting that prevents the users from selecting personal configuration settings that modify the user group configuration settings.

32. The article of claim 29, the operations further comprising sending a software application to a client, wherein execution of the software application by the client provides a graphical user interface that allows selection of user group configuration settings, and the received identification of user group configuration settings includes data generated based on a user interaction with the graphical user interface.

33. The article of claim 32, wherein the software application comprises at least one of a standalone application or a web application.

34. The article of claim 29, wherein the user group configuration settings specify an authentication method to authenticate the users in the user group.

35. The article of claim 34, wherein sending the first personal web page over a network to the first client device comprises authenticating a user of the first client device according to the authentication method.

36. The article of claim 29, wherein the user group configuration settings specify a domain name to be associated with the user group.

37. The article of claim 29, the operations further comprising storing at least a portion of the user group configuration settings in a dynamic table.

38. The article of claim 29, the operations further comprising sending the generated first personal web page to a client device over a network in a secure manner.

39. The article of claim 29, further comprising storing at least a portion of the user group configuration settings using a scalable storage system platform.

40. The article of claim 29, wherein generating the first personal web page comprises retrieving at least one of the user group configuration settings or the personal configuration settings for the first user from a configuration server.

41. The article of claim 29, wherein receiving an identification of user group configuration settings comprises using a configuration server to store the identification of user group configuration settings, the configuration server including:
- a first layer to provide a user interface to a client and receive data from the user interface;
- a second layer to verify the data received by the first layer from the user interface and to convert the verified data into a predetermined format;
- a third layer to receive the converted data from the second layer and provide instructions to a fourth layer; and
- a fourth layer to upload the converted data to a data storage system based on interactions with the third layer.

42. The article of claim 29, wherein the one or more of the first plurality of content modules included in the first personal web page correspond to the one or more of the first plurality of content modules included in a second personal web page.

* * * * *